United States Patent
Buchan et al.

(10) Patent No.: US 11,281,881 B2
(45) Date of Patent: Mar. 22, 2022

(54) DEVICE INCLUDING AN ULTRASONIC FINGERPRINT SENSOR AND A COULOMB FORCE APPARATUS

(71) Applicant: QUALCOMM Incorporated, San Diego, CA (US)

(72) Inventors: Nicholas Ian Buchan, San Jose, CA (US); Hrishikesh Vijaykumar Panchawagh, Cupertino, CA (US); Harish Ananthakrishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 16/867,482

(22) Filed: May 5, 2020

(65) Prior Publication Data

US 2021/0350099 A1    Nov. 11, 2021

(51) Int. Cl.
    *G06K 9/00*    (2006.01)
(52) U.S. Cl.
    CPC ....... *G06K 9/0002* (2013.01); *G06K 9/00087* (2013.01)
(58) Field of Classification Search
    None
    See application file for complete search history.

(56) References Cited

U.S. PATENT DOCUMENTS

| 2012/0268412 | A1* | 10/2012 | Cruz-Hernandez | G06F 3/016 345/174 |
| 2018/0365477 | A1* | 12/2018 | Seol | H04M 1/725 |
| 2019/0011040 | A1* | 1/2019 | Fribus | G06F 3/04886 |
| 2019/0094968 | A1 | 3/2019 | Wen et al. | |

FOREIGN PATENT DOCUMENTS

WO    WO2013181361 A2    12/2013

OTHER PUBLICATIONS

International Search Report and Written Opinion—PCT/US2021/024490—ISA/EPO—dated Jun. 23, 2021.

* cited by examiner

*Primary Examiner* — Nicholas J Lee
(74) *Attorney, Agent, or Firm* — Qualcomm Incorporated

(57) ABSTRACT

An apparatus may include an ultrasonic sensor system, a Coulomb force apparatus and a control system. The control system may be configured for controlling the Coulomb force apparatus for application of a Coulomb force to a digit in contact with an outer surface of the apparatus in a fingerprint sensor area and for controlling the ultrasonic fingerprint sensor for transmission of first ultrasonic waves towards the digit. The control system may be configured for synchronizing the application of the Coulomb force and the transmission of the first ultrasonic waves. The control system may be configured for receiving ultrasonic receiver signals from the ultrasonic fingerprint sensor and for performing an authentication process based, at least in part, on the ultrasonic receiver signals. The ultrasonic receiver signals may, in some instances, include signals corresponding to reflections of the first ultrasonic waves from the digit.

30 Claims, 14 Drawing Sheets

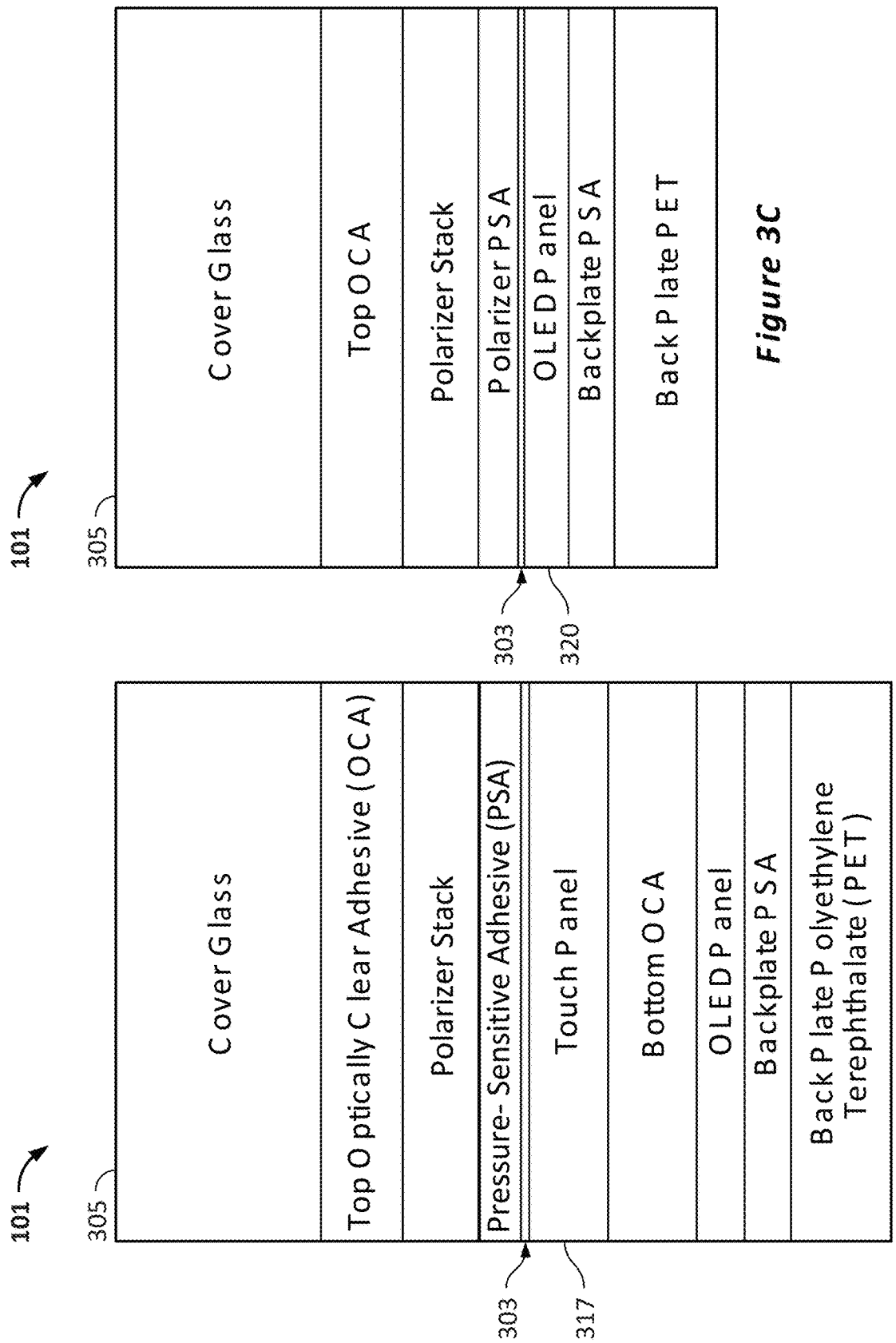

DEVICE INCLUDING AN ULTRASONIC FINGERPRINT SENSOR AND A COULOMB FORCE APPARATUS

TECHNICAL FIELD

This disclosure relates generally to ultrasonic sensor systems and methods for using such systems.

DESCRIPTION OF THE RELATED TECHNOLOGY

Ultrasonic fingerprint sensors have been included in devices such as smartphones, cash machines and cars to authenticate a user. Although some existing ultrasonic fingerprint sensors can provide satisfactory performance, improved ultrasonic fingerprint sensors would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include an ultrasonic fingerprint sensor residing in a fingerprint sensor area, a Coulomb force apparatus and a control system that is configured for communication with the ultrasonic fingerprint sensor and the Coulomb force apparatus. According to some implementations, an area occupied by the Coulomb force apparatus may be equal to, or substantially equal to, the fingerprint sensor area. However, in some instances, the area occupied by the Coulomb force apparatus may extend beyond the fingerprint sensor area. In some examples, at least a portion of the control system may be coupled to the ultrasonic fingerprint sensor and the Coulomb force apparatus. In some implementations, a mobile device may be, or may include, the apparatus. For example, a mobile device may include an apparatus as disclosed herein. In some examples, the apparatus may include a platen.

In some examples, the Coulomb force apparatus may be configured for applying a Coulomb force in the fingerprint sensor area. According to some examples, the control system may be configured for controlling the Coulomb force apparatus for application of a Coulomb force to a digit in contact with an outer surface of the apparatus in the fingerprint sensor area. In some examples, the control system may be configured for controlling the ultrasonic fingerprint sensor for transmission of first ultrasonic waves towards the digit. According to some examples, the control system may be configured for synchronizing the application of the Coulomb force and the transmission of the first ultrasonic waves. In some examples, the control system may be configured for receiving ultrasonic receiver signals from the ultrasonic fingerprint sensor. The ultrasonic receiver signals may include signals corresponding to reflections of the first ultrasonic waves from the digit. According to some examples, the control system may be configured for performing an authentication process based, at least in part, on the ultrasonic receiver signals.

In some examples, the Coulomb force may be an electrostatic force. In some such examples, controlling the Coulomb force apparatus may involve applying a constant voltage to the Coulomb force apparatus for a time interval.

In some instances, the Coulomb force may be an electrovibrational force. In some such examples, controlling the Coulomb force apparatus may involve applying a time-varying voltage to the Coulomb force apparatus. According to some such examples, the control system may include an electrovibration actuator. In some instances, the control system may be configured for controlling the Coulomb force apparatus for generation of the electrovibrational force in a plane of the outer surface. Alternatively, or additionally, the control system may be configured for controlling the Coulomb force apparatus for generation of the electrovibrational force perpendicular to the plane of the outer surface.

In some implementations, synchronizing the application of the Coulomb force and the transmission of the first ultrasonic waves may involve controlling the Coulomb force apparatus for application of the Coulomb force during a first time interval. According to some such implementations, synchronizing the application of the Coulomb force and the transmission of the first ultrasonic waves may involve controlling the ultrasonic fingerprint sensor for transmission of the first ultrasonic waves during a second time interval that is after the first time interval. In some implementations, synchronizing the application of the Coulomb force and the transmission of the first ultrasonic waves may involve controlling the ultrasonic fingerprint sensor for transmission of the first ultrasonic waves during a second time interval that at least partially coincides with the first time interval. In some such implementations, the first time interval may begin before the second time interval and may include the second time interval.

In some examples, the control system may be configured for controlling the Coulomb force apparatus for application of a Coulomb force in the fingerprint sensor area. In some such examples, the Coulomb force may have a component that is perpendicular to the outer surface.

According to some implementations, the control system may be configured for controlling the Coulomb force apparatus to cause a higher level of at least one of static frictional force or dynamic frictional force in the fingerprint sensor area, as compared to the static frictional force or dynamic frictional force outside of the fingerprint sensor area. Alternatively, or additionally, the outer surface may have a first texture in the fingerprint sensor area and a second texture outside of the fingerprint sensor area.

In some instances, the control system may be configured for controlling the Coulomb force apparatus to cause an electrovibrational force in the fingerprint sensor area. The electrovibrational force may cause haptic feedback to the digit.

According to some implementations, the apparatus also may include a touch sensor system. In some such implementations, the control system may be configured for determining a digit position based on one or more signals received from the touch sensor system and for controlling the Coulomb force apparatus according to the digit position. Alternatively, or additionally, the control system may be further configured for determining a digit position based on one or more signals received from the Coulomb force apparatus.

Other innovative aspects of the subject matter described in this disclosure may be implemented in a method. According to some implementations, the method may involve controlling a Coulomb force apparatus for application of a Coulomb force to a digit in contact with an outer surface of the apparatus in a fingerprint sensor area. In some examples, the method may involve controlling an ultrasonic fingerprint sensor for transmission of first ultrasonic waves towards the digit. According to some examples, the method may involve synchronizing the application of the Coulomb force and the transmission of the first ultrasonic waves. In some examples, the method may involve receiving ultrasonic receiver signals from the ultrasonic fingerprint sensor. The ultrasonic receiver signals may include signals corresponding to reflections of the first ultrasonic waves from the digit. According to some examples, the method may involve performing an authentication process based, at least in part, on the ultrasonic receiver signals.

According to some implementations, controlling the Coulomb force apparatus may involve applying a constant voltage to the Coulomb force apparatus for a time interval. In some instances, controlling the Coulomb force apparatus may involve applying a time-varying voltage to the Coulomb force apparatus.

In some implementations, synchronizing the application of the Coulomb force and the transmission of the first ultrasonic waves may involve controlling the Coulomb force apparatus for application of the Coulomb force during a first time interval. According to some such implementations, synchronizing the application of the Coulomb force and the transmission of the first ultrasonic waves may involve controlling the ultrasonic fingerprint sensor for transmission of the first ultrasonic waves during a second time interval that is after the first time interval. In some implementations, synchronizing the application of the Coulomb force and the transmission of the first ultrasonic waves may involve controlling the ultrasonic fingerprint sensor for transmission of the first ultrasonic waves during a second time interval that at least partially coincides with the first time interval. In some such implementations, the first time interval may begin before the second time interval and may include the second time interval.

In some examples, the method may involve controlling the Coulomb force apparatus to cause a higher level of at least one of static frictional force or dynamic frictional force in the fingerprint sensor area, as compared to the static frictional force or dynamic frictional force outside of the fingerprint sensor area.

In some such implementations, the method may involve determining a digit position based on one or more signals received from a touch sensor system. In some such implementations, the method may involve controlling the Coulomb force apparatus according to the digit position.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method. In some implementations, the software may include instructions for controlling an apparatus that includes an ultrasonic fingerprint sensor and a Coulomb force apparatus. According to some such examples, the method may involve controlling the Coulomb force apparatus for application of a Coulomb force to a digit in contact with an outer surface of the apparatus in a fingerprint sensor area. In some examples, the method may involve controlling the ultrasonic fingerprint sensor for transmission of first ultrasonic waves towards the digit. According to some examples, the method may involve synchronizing the application of the Coulomb force and the transmission of the first ultrasonic waves. In some examples, the method may involve receiving ultrasonic receiver signals from the ultrasonic fingerprint sensor. The ultrasonic receiver signals may include signals corresponding to reflections of the first ultrasonic waves from the digit. According to some examples, the method may involve performing an authentication process based, at least in part, on the ultrasonic receiver signals.

According to some implementations, controlling the Coulomb force apparatus may involve applying a constant voltage to the Coulomb force apparatus for a time interval. In some instances, controlling the Coulomb force apparatus may involve applying a time-varying voltage to the Coulomb force apparatus.

In some implementations, synchronizing the application of the Coulomb force and the transmission of the first ultrasonic waves may involve controlling the Coulomb force apparatus for application of the Coulomb force during a first time interval. According to some such implementations, synchronizing the application of the Coulomb force and the transmission of the first ultrasonic waves may involve controlling the ultrasonic fingerprint sensor for transmission of the first ultrasonic waves during a second time interval that is after the first time interval. In some implementations, synchronizing the application of the Coulomb force and the transmission of the first ultrasonic waves may involve controlling the ultrasonic fingerprint sensor for transmission of the first ultrasonic waves during a second time interval that at least partially coincides with the first time interval. In some such implementations, the first time interval may begin before the second time interval and may include the second time interval.

In some examples, the method may involve controlling the Coulomb force apparatus to cause a higher level of at least one of static frictional force or dynamic frictional force in the fingerprint sensor area, as compared to the static frictional force or dynamic frictional force outside of the fingerprint sensor area.

In some such implementations, the method may involve determining a digit position based on one or more signals received from a touch sensor system. In some such implementations, the method may involve controlling the Coulomb force apparatus according to the digit position.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIGS. 3B and 3C shows examples of layer stacks of an apparatus according to some disclosed implementations.

DETAILED DESCRIPTION

Figure 1:
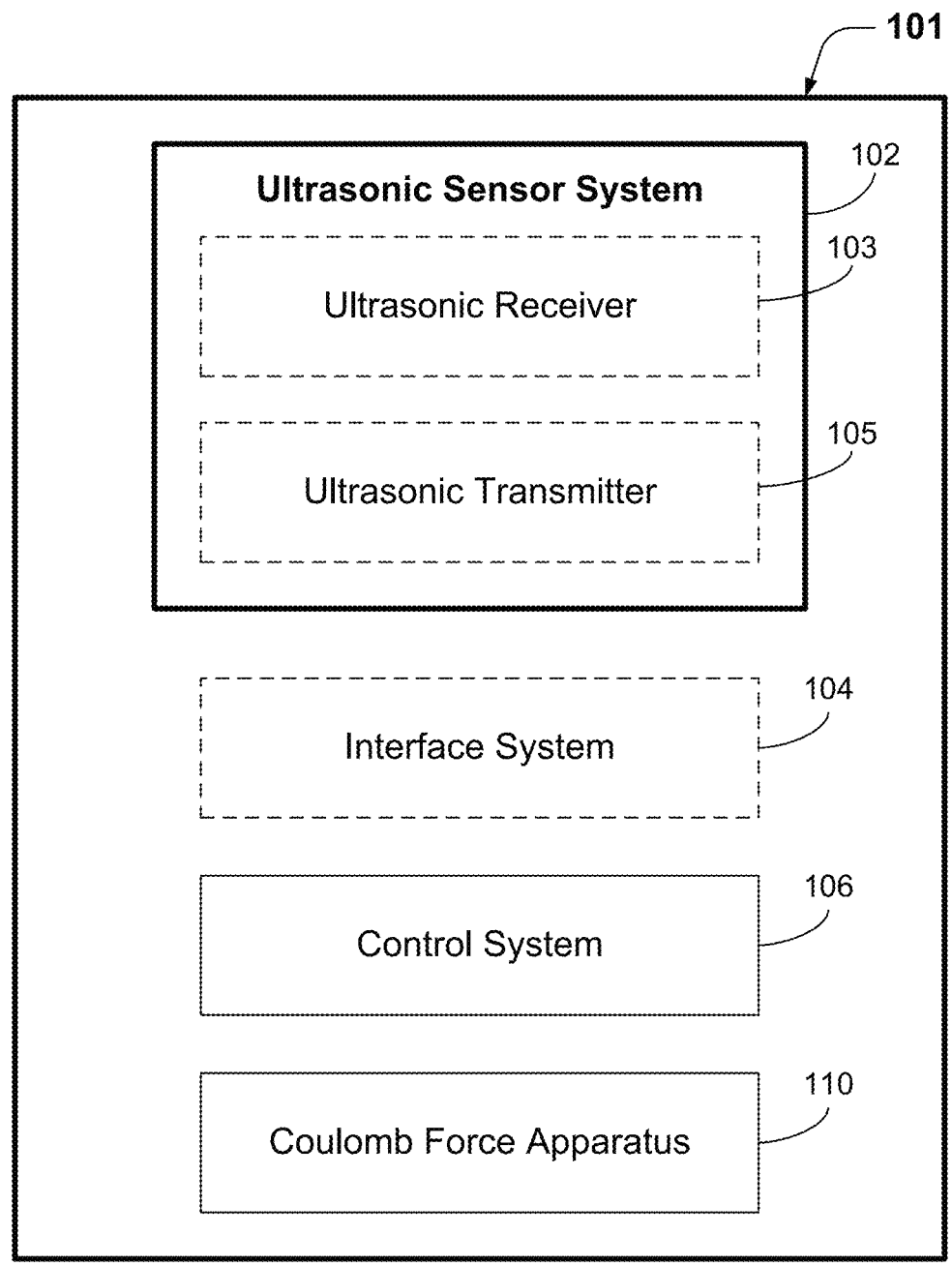
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, automobile doors, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Poor coupling of the finger to the platen of an ultrasonic fingerprint sensor is a common problem. (As used herein, the term "finger" can refer to any digit, including a thumb. Accordingly, the term "fingerprint" as used herein may refer to a print from any digit, including a thumb.) Poor coupling can occur when the finger is dry and/or when low finger pressure is applied.

In some implementations, an apparatus may include an ultrasonic sensor system, a Coulomb force apparatus and a control system. According to some examples, the ultrasonic sensor system may include an ultrasonic receiver and an ultrasonic transmitter configured for transmitting ultrasonic waves, e.g., ultrasonic waves in the range of 1 MHz to 30 MHz. In some implementations, the Coulomb force apparatus may be configured for applying an electrostatic force to a digit in contact with an apparatus. Alternatively, or additionally, the Coulomb force apparatus may be configured for generating low-frequency vibrations of a digit in contact with an apparatus, e.g., low-frequency vibrations in the range of 1 Hz to 2000 Hz. In some implementations, the control system may be configured for synchronizing the generation of the low-frequency vibrations and the transmission of the ultrasonic waves.

Particular implementations of the subject matter described in this disclosure may be implemented to realize one or more of the following potential advantages. The Coulomb force apparatus may improve coupling in various ways. For example, a Coulomb force exerted on a digit by the Coulomb force apparatus may cause the digit to press harder on the platen, may cause pores to exude more sweat and/or oil, may spread out oil and/or sweat to better couple a digit to the platen, etc. In some instances, the Coulomb force may "hammer down" fingerprint ridges. According to some implementations, the Coulomb force apparatus may be configured to cause a higher level of static frictional force and/or dynamic frictional force in a fingerprint sensor area, as compared to the static frictional force or dynamic frictional force outside of the fingerprint sensor area. Alternatively, or additionally, in some implementations, an outer surface of the apparatus may have a first texture in the fingerprint sensor area and a second texture outside of the fingerprint sensor area. Such implementations may be potentially advantageous, because a user may be able to determine the location of the fingerprint sensor area even if the fingerprint sensor is not visible, e.g., because the fingerprint sensor is below a display of the apparatus. According to some examples, electrovibration caused by the Coulomb force apparatus may allow for relatively more accurate discrimination between fingerprint features and background image features.

FIG. 1 is a block diagram that shows example components of an apparatus according to some disclosed implementations. In this example, the apparatus 101 includes an ultrasonic sensor system 102, a control system 106 and a Coulomb force apparatus 110. Some implementations of the apparatus 101 may include an interface system 104.

In various implementations, the Coulomb force apparatus 110 may include a conductive layer within the apparatus 101. In some implementations, the apparatus 101 may include a touch sensor layer. In some such examples, the conductive layer of the Coulomb force apparatus 110 may reside between the touch sensor layer and a surface of the apparatus 101. In some alternative examples, the conductive layer of the Coulomb force apparatus 110 may be part of a touch sensor layer or part of another layer, such as a display stack layer.

By causing the conductive layer to be charged to a potential, the Coulomb force apparatus 110 may cause an opposite charge to accumulate on the surface of a finger touching the surface of the apparatus 101. The opposite charges of the conductive layer and the finger can create a Coulomb force that may, in some instances, be detectable by the finger. Whether or not the Coulomb force is detectable by the finger, the Coulomb force may nonetheless improve coupling between the finger and an outer surface of the apparatus 101. Such improved coupling may, in some instances, result in relatively higher quality of fingerprint images obtained via the ultrasonic sensor system 102.

Moreover, whether or not the Coulomb force itself is detectable by a finger, the Coulomb force may nonetheless cause a higher level of at least one of static frictional force or dynamic frictional force between a finger and an outer surface of the apparatus 101 due to an increased force on the finger along the outer surface of the apparatus 101. The higher level of friction may be detectable by a finger. In some examples, the Coulomb force apparatus may be configured to exert a Coulomb force in only a portion of the apparatus 101. For example, the Coulomb force apparatus may be configured to cause a higher level of at least one of static frictional force or dynamic frictional force in the fingerprint sensor area, as compared to the static frictional force or dynamic frictional force outside of the fingerprint sensor area. Such implementations may allow a user to determine the location of the fingerprint sensor area even if the fingerprint sensor is not visible, e.g., because the fingerprint sensor is below a display of the apparatus 101.

In some such implementations, the conductive layer of the Coulomb force apparatus 110 may reside only in the area in which the ultrasonic sensor system resides. An area occupied by the Coulomb force apparatus, or at least the area occupied by the conductive layer of the Coulomb force apparatus may be equal to, or substantially equal to, the fingerprint sensor area. For example, "substantially equal to" may mean that the area occupied by the conductive layer of the Coulomb force apparatus extends over at least a percentage of the fingerprint sensor area, e.g., at least 80%, at least 85%, at least 90%, at least 95%, etc. Alternatively, or additionally, in this context "substantially equal to" may mean that the area occupied by the conductive layer of the Coulomb force apparatus extends outside the fingerprint sensor area by no more than a percentage of the fingerprint sensor area, e.g., no more than 20%, no more than 15%, no more than 10%, no more than 5%, etc.

However, in alternative implementations, the area occupied by the conductive layer of the Coulomb force apparatus 110 may extend beyond the fingerprint sensor area. According to some such implementations in which the apparatus 101 includes a touch sensor layer, the Coulomb force apparatus 110 may extend across the entire touch sensor layer of the apparatus 101. The control system 106 may, for example, determine the location of a finger on a surface of the apparatus 101 according to touch sensor signals. The control system 106 may, in some examples, be configured for controlling the Coulomb force apparatus to cause a higher level of at least one of static frictional force or dynamic frictional force in the fingerprint sensor area, as compared to the static frictional force or dynamic frictional force outside of the fingerprint sensor area, whether or not the conductive layer of the Coulomb force apparatus 110 extends beyond the fingerprint sensor area.

In some examples, the control system may be configured for controlling the Coulomb force apparatus to apply electrovibrational forces to a finger at a single frequency. In other examples, the control system may be configured for controlling the Coulomb force apparatus to apply electrovibrational forces to a finger at multiple frequencies, e.g., to produce a frequency-modulated waveform. In one such example, the frequency-modulated waveform may be a "chirp," which is a signal in which the frequency increases (up-chirp) or decreases (down-chirp) with time. In some such examples, the highest frequency of the chirp may be in the kHz range. In some instances, the control system may be configured for controlling the Coulomb force apparatus to apply electrovibrational forces to a finger continuously, e.g., during a time interval. In other examples the control system may be configured for controlling the Coulomb force apparatus to apply electrovibrational forces to a finger intermittently, e.g., during a time interval. The time interval may, for example, be the time interval 404 that is described below with reference to FIG. 4.

In some examples, the conductive layer of the Coulomb force apparatus 110 may be below a cover glass of a display device. According to some such implementations, the conductive layer of the Coulomb force apparatus 110 may reside between a cover glass and a display stack, such as an organic light-emitting diode (OLED) stack. According to some such examples, the conductive layer of the Coulomb force apparatus 110 may be, or may include, optically transparent material, such as indium tin oxide (ITO). In some examples, the Coulomb force apparatus 110 may include a layer of tactile pixels. According to some implementations, the tactile pixels may be similar to those of the Senseg E-Sense® device. Various examples of where the conductive layer of the Coulomb force apparatus 110 may reside in a device layer stack are described below.

In some examples, as suggested by the dashed lines within the ultrasonic sensor system 102, the ultrasonic sensor system 102 may include an ultrasonic receiver 103 and a separate ultrasonic transmitter 105. In some such examples, the ultrasonic transmitter 105 may include an ultrasonic plane-wave generator, such as those described below.

However, various examples of ultrasonic sensor systems 102 are disclosed herein, some of which may include a separate ultrasonic transmitter 105 and some of which may not. Although shown as separate elements in FIG. 1, in some implementations the ultrasonic receiver 103 and the ultrasonic transmitter 105 may be combined in an ultrasonic transceiver system. For example, in some implementations, the ultrasonic sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. In some implementations that include a piezoelectric layer, other piezoelectric materials may be used in the piezoelectric layer, such as aluminum nitride (AlN) or lead zirconate titanate (PZT). The ultrasonic sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

The ultrasonic sensor system 102 and the Coulomb force apparatus 110 may, in some instances, be mechanically coupled. In some examples the ultrasonic sensor system 102 and the Coulomb force apparatus 110 may be indirectly coupled. For example, the ultrasonic sensor system 102 and the Coulomb force apparatus 110 each may be coupled to a portion of the apparatus 101. In some such examples, the ultrasonic sensor system 102 and the Coulomb force apparatus 110 each may be coupled to a portion of the control system. However, in some examples the ultrasonic sensor system 102 and the Coulomb force apparatus 110 may be directly coupled to one another.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 may include a dedicated component for controlling the Coulomb force apparatus 110, which may include an electrostatic force actuator and/or an electrovibration actuator. The control system 106 also may include (and/or be configured for communication with) one or more memory devices, such as one or more random access memory (RAM) devices, read-only memory (ROM) devices, etc. Accordingly, the apparatus 101 may have a memory system that includes one or more memory devices, though the memory system is not shown in FIG. 1. The control system 106 may be configured for receiving and processing data from the ultrasonic sensor system 102, e.g., from the ultrasonic receiver 103. If the apparatus 101 includes a separate ultrasonic transmitter 105, the control system 106 may be configured for controlling the ultrasonic transmitter 105, e.g., as disclosed elsewhere herein. In some implementations, functionality of the control system 106 may be partitioned between one or more controllers or processors, such as between a dedicated sensor controller and an applications processor of a mobile device. Some examples are described below.

Some implementations of the apparatus 101 may include an interface system 104. In some examples, the interface system may include a wireless interface system. In some implementations, the interface system may include a user interface system, one or more network interfaces, one or more interfaces between the control system 106 and a memory system, and/or one or more interfaces between the control system 106 and one or more external device interfaces (e.g., ports or applications processors).

The interface system 104 may be configured to provide communication (which may include wired or wireless communication, such as electrical communication, radio communication, etc.) between components of the apparatus 101. In some such examples, the interface system 104 may be configured to provide communication between the control system 106 and the ultrasonic sensor system 102, and between the control system 106 and the Coulomb force apparatus 110. According to some such examples, the interface system 104 may couple at least a portion of the control system 106 to the ultrasonic sensor system 102 and the Coulomb force apparatus 110, e.g., via electrically conducting material (e.g., via conductive metal wires or traces. If the apparatus 101 includes an ultrasonic transmitter 105 that is separate from the ultrasonic receiver 103, the interface system 104 may be configured to provide communication between at least a portion of the control system 106 and the ultrasonic transmitter 105. According to some examples, the interface system 104 may be configured to provide communication between the apparatus 101 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces or a serial peripheral interface (SPI)). In some implementations, the apparatus 101 may include a memory system. The interface system 104 may, in some examples, include at least one interface between the control system 106 and a memory system.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 2:
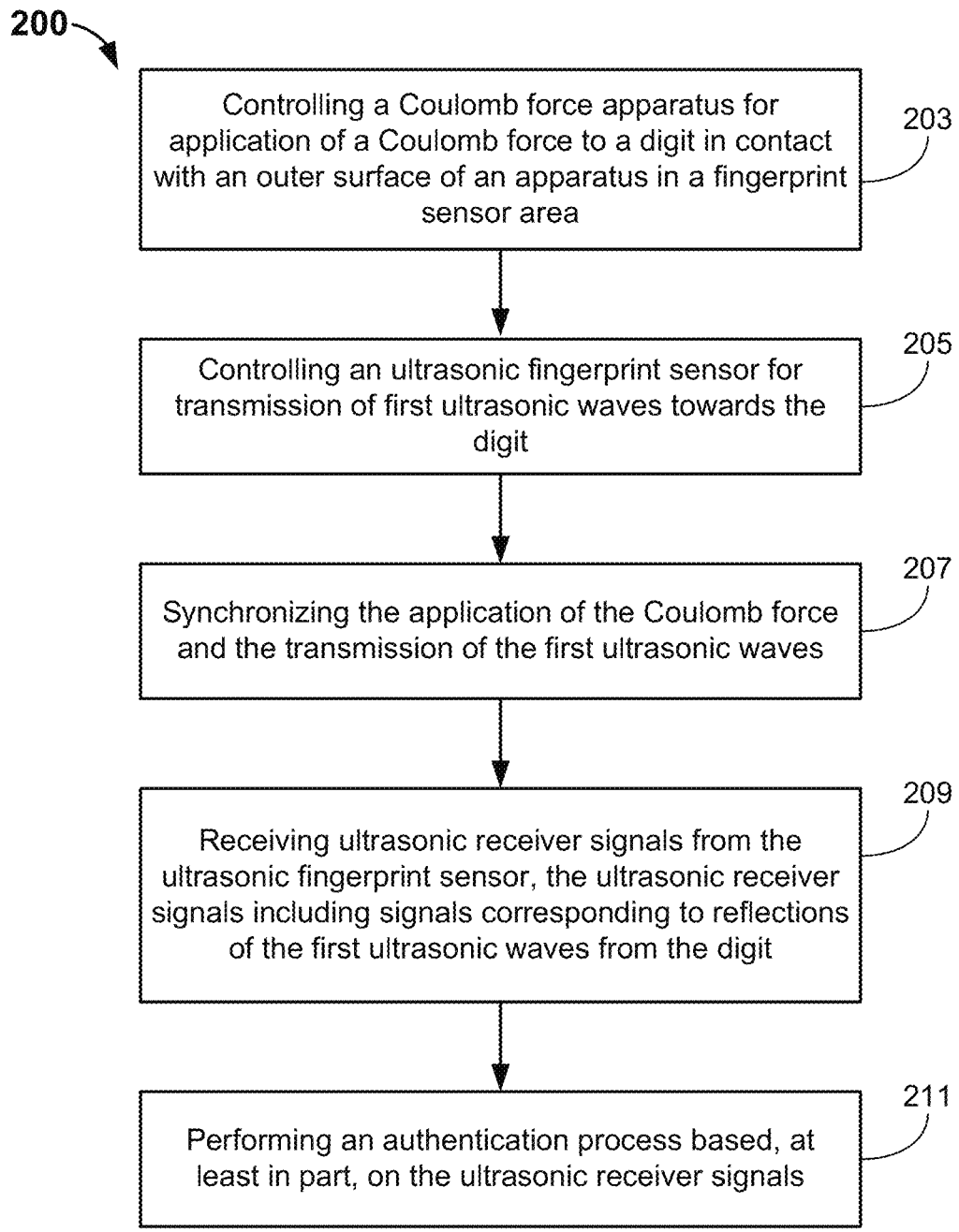
FIG. 2 is a flow diagram that provides example blocks of some methods disclosed herein.

FIG. 2 is a flow diagram that provides example blocks of some methods disclosed herein. The blocks of FIG. 2 may, for example, be performed by the apparatus 101 of FIG. 1 or by a similar apparatus. As with other methods disclosed herein, the method 200 outlined in FIG. 2 may include more or fewer blocks than indicated. Moreover, the blocks of methods disclosed herein are not necessarily performed in the order indicated. In some examples, some blocks of methods disclosed herein may be performed concurrently.

According to this example, the method 200 is a method of controlling an apparatus that includes an ultrasonic fingerprint sensor and a Coulomb force apparatus. In this example, the ultrasonic fingerprint sensor resides in an ultrasonic fingerprint sensor area. At least part of the Coulomb force apparatus resides in the ultrasonic fingerprint sensor area and in this example, the Coulomb force apparatus is configured for applying a Coulomb force at least in the fingerprint sensor area. According to some examples, the Coulomb force apparatus may extend outside the ultrasonic fingerprint sensor area. In some examples, the Coulomb force apparatus may be configured for applying a Coulomb force in one or more areas that are outside of the fingerprint sensor area.

According to this implementation, block 203 involves controlling, by a control system, the Coulomb force apparatus for application of a Coulomb force to a digit in contact with an outer surface of the apparatus in the fingerprint sensor area. In some examples, the control system may be the control system 106 of the apparatus 101 that is shown in FIG. 1.

According to some examples, the apparatus may include a touch sensor system. In some such examples, a previous process of the method 200 may have involved determining, by a control system, a digit position based on one or more signals received from the touch sensor system. Block 203 may, in some such examples, involve controlling the Coulomb force apparatus according to the digit position. However, in some alternative examples, the control system may be configured for determining a digit position based on one or more signals received from the Coulomb force apparatus.

In some examples, block 203 may involve causing the Coulomb force apparatus to apply at least a component of the Coulomb force to the digit along an axis that is perpendicular to the plane of the outer surface. However, the Coulomb force may, in some instances, include a component along an axis that is parallel to the plane of the outer surface.

According to some examples, block 203 may involve causing the Coulomb force apparatus to apply an electrostatic force. For example, block 203 may involve applying a constant voltage to the Coulomb force apparatus for a time interval. However, in some examples block 203 may involve causing the Coulomb force apparatus to apply an electrovibrational force. For example, block 203 may involve applying a time-varying voltage to the Coulomb force apparatus. According to some examples, the electrovibrational force may cause haptic feedback to the digit.

Some such implementations may involve controlling the Coulomb force apparatus to cause a higher level of static frictional force and/or dynamic frictional force between a finger and an outer surface when the finger is in the fingerprint sensor area, as compared to the static frictional force or dynamic frictional force between the finger and the outer surface when the finger is outside of the fingerprint sensor area. The relatively higher frictional force may be caused when and where the Coulomb force is being applied along an axis that is perpendicular to the plane of the outer surface. Such implementations may be particularly useful if, for example, the location of the fingerprint sensor is not visible. In some such examples, the fingerprint sensor may reside under a display. According to some examples, a touch sensor may indicate to a control system when a target object, such as a user's finger, is touching an area corresponding to the location of the fingerprint sensor. In response to this indication, the control system may cause a Coulomb force to be applied in an area corresponding to the location of the fingerprint sensor. A user may perceive the Coulomb force and may therefore be made aware of the location of the fingerprint sensor.

In this example, block 205 involves controlling the ultrasonic fingerprint sensor for transmission of first ultrasonic waves towards the digit. Block 205 may, for example, involve controlling an ultrasonic sensor system, such as the ultrasonic sensor system 102 of FIG. 1, to transmit the first ultrasonic waves. In some examples, block 205 may involve controlling the ultrasonic sensor system to transmit ultrasonic waves in the range of 1 MHz to 30 MHz. For example, an ultrasonic transmitter of the ultrasonic sensor system may be controlled for transmission of the first ultrasonic waves.

According to this example, block 207 involves synchronizing the application of the Coulomb force and the transmission of the first ultrasonic waves. In some instances, block 207 may involve controlling the Coulomb force apparatus for generation of the Coulomb force during a first time interval and controlling the ultrasonic transmitter for transmission of the first ultrasonic waves during a second time interval that is after the first time interval. According to some examples, block 207 may involve controlling the Coulomb force apparatus for generation of the Coulomb force during a first time interval and controlling the ultrasonic transmitter for transmission of the first ultrasonic waves during a second time interval that at least partially coincides with the first time interval. In some such examples, the first time interval begins before the second time interval and includes the second time interval. Some examples are described below.

In this example, block 209 involves receiving ultrasonic receiver signals from an ultrasonic receiver. According to this example, the ultrasonic receiver signals include signals corresponding to reflections of the first ultrasonic waves from the digit.

According to this example, block 211 involves performing an authentication process based, at least in part, on the ultrasonic receiver signals received in block 209. In some instances, block 211 may involve obtaining fingerprint image data corresponding to the signals. As used herein, the term "fingerprint image data" may refer generally to data obtained from, or data based on signals obtained from, an ultrasonic receiver. In some instances, the fingerprint image data may correspond, at least in part, to a target object such as a finger that may include a fingerprint. The fingerprint image data may or may not be presented in a form that is recognizable to a human being as being an image. For example, the fingerprint image data may be, or may include, a data structure in which numerical values are arranged and/or stored. The numerical values may, in some examples, correspond to signals received from an ultrasonic sensor system, an optical sensor system, a capacitive sensor system, etc. In some examples, the fingerprint image data may correspond to signals received from a sensor system during a time window. In some instances, the fingerprint image data may correspond to signals received from a particular area, such as a fingerprint contact area. In some instances, the fingerprint image data may be, or may include, data that has been aggregated and/or processed in some manner after having been acquired from a sensor system. Some examples of such processing are disclosed herein.

In some examples, block 211 may involve extracting features from the ultrasonic receiver signals. The authentication process may be based, at least in part, on the features. According to some examples, the features may be fingerprint features, such as the locations, orientations and/or types of fingerprint minutiae. In some such examples, the fingerprint image data may include indications of one or more fingerprint features detected in at least a portion of the signals from the sensor system (such as an ultrasonic sensor system). The fingerprint features may include one or more fingerprint ridge features and one or more fingerprint valley features. The fingerprint features may, for example, be detected by a control system such as the control system 106 of FIG. 1.

Signals indicating fingerprint ridge features may generally be obtained from sensor pixels of the ultrasonic sensor system that are responding to ultrasonic waves that have been reflected from platen/fingerprint ridge interfaces. Signals indicating fingerprint valley features may generally be obtained from sensor pixels that are responding to ultrasonic waves that have been reflected from platen/fingerprint valley interfaces. The reflections from a platen/fingerprint valley interface will generally be reflections from a platen/air interface, whereas the reflections from a platen/fingerprint ridge interface will generally be reflections from a platen/ skin interface, corresponding to areas in which fingerprint ridges are in contact with a platen.

In some examples, the features may include background image features. Some disclosed implementations involve distinguishing background image features from fingerprint features.

According to some implementations, method 200 may involve additional processes that depend on the outcome of the authentication process of block 211. For example, if the authentication process concludes successfully, a control system may allow access to a device and/or to a secure area.

In some such instances, a control system may unlock a mobile device, a laptop computer, a door, an automobile, or another device.

Figure 3A:
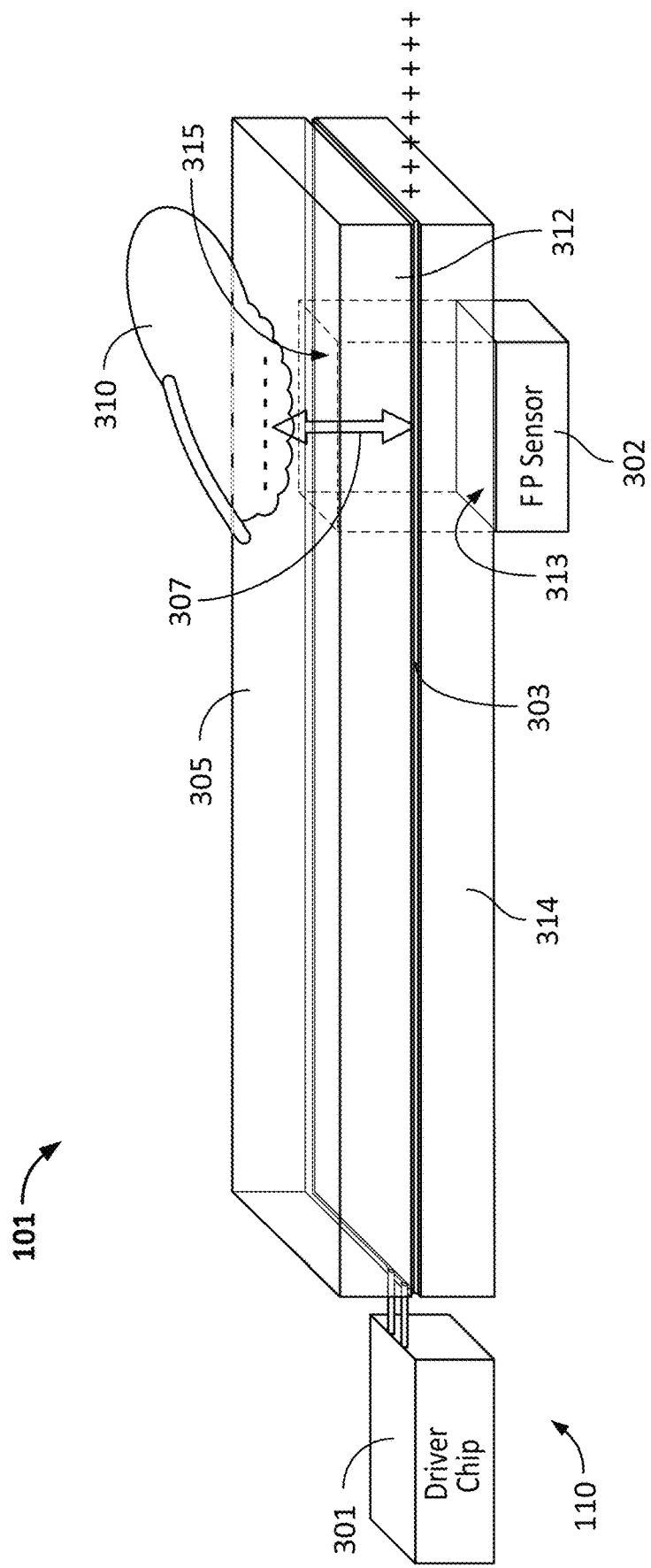
FIG. 3A shows example components of an apparatus according to some disclosed implementations.

FIG. 3A shows example components of an apparatus according to some disclosed implementations. In the example shown in FIG. 3A, the Coulomb force apparatus 110 includes a driver chip 301 and a conductive layer 303. According to this example, the conductive layer 303 resides between the cover glass 312 and the layer 314. The layer 314 may be a touch sensor layer, a display layer, etc., depending on the particular implementation. By causing the conductive layer 303 to be charged to a potential, the Coulomb force apparatus 110 can cause an opposite charge to accumulate on the surface of the finger 310 that is touching the outer surface 305 of the apparatus 101. In this example, the outer surface 305 is an outer surface of the cover glass 312. The opposite charges of the conductive layer 303 and the finger 310 create a Coulomb force between the finger 310 and the outer surface 305. In this implementation, the Coulomb force is perpendicular to the plane of the outer surface 305.

According to this implementation, the driver chip 301 is a component of a control system, which may be the control system 106 that is shown in FIG. 1 and described above. In some examples, the control system may be configured for causing the Coulomb force apparatus 110 to cause low-frequency electrovibrations of the finger 310 along an axis that is perpendicular to the plane of the outer surface 305, as indicated by the arrow 307. In some such examples, the driver chip 301 may be configured to function, at least in part, as an electrovibration actuator. For example, the driver chip 301 may be configured for applying a time-varying voltage to the conductive layer 303.

According to this example, the fingerprint (FP) sensor 302 is an instance of the ultrasonic sensor system 102 that is shown in FIG. 1 and described above. In this example, the top area 313 of the fingerprint (FP) sensor 302 corresponds with the fingerprint sensor area 315 that is indicated on the outer surface 305. According to this implementation, the control system is configured for controlling the Coulomb force apparatus for application of a Coulomb force to the finger 310 when the finger 310 is in contact with the outer surface 305 in the fingerprint sensor area 315. According to some such implementations, the layer 314 (or another layer of the apparatus 101) may be, or may include, a touch sensor layer. The control system may, for example, determine the location of the finger 310 according to touch sensor signals. According to some such examples, the driver chip 301 may be configured for applying a time-varying voltage to the conductive layer 303 when the finger 310 is in contact with the outer surface 305 in the fingerprint sensor area.

In some implementations, the driver chip 301 may be configured for applying a constant voltage to the Coulomb force apparatus for a time interval when the finger 310 is in contact with the outer surface 305 in the fingerprint sensor area. The control system may, in some such examples, be configured for controlling the Coulomb force apparatus to cause a higher level of at least one of static frictional force or dynamic frictional force between the finger 310 and the outer surface 305 when the finger 310 is in contact with the outer surface 305 in the fingerprint sensor area, as compared to the static frictional force or dynamic frictional force between the finger 310 and the outer surface 305 when the finger 310 is in contact with the outer surface 305 outside of the fingerprint sensor area 315. Alternatively, or additionally, in some implementations, an outer surface of the apparatus may have a first texture in the fingerprint sensor area and a second texture outside of the fingerprint sensor area. Such implementations may allow a user to be able to determine the location of the fingerprint sensor area even if the fingerprint sensor area is not visible, e.g., because the fingerprint sensor is below a display of the apparatus.

FIGS. 3B and 3C show examples of layer stacks of an apparatus according to some disclosed implementations. In the examples shown in FIGS. 3B and 3C, the conductive layer 303 of the Coulomb force apparatus is a re-purposed conductive layer of another component of the apparatus 101. In the "on cell" example shown in FIG. 3B, the conductive layer 303 of the Coulomb force apparatus is also a conductive layer of the touch panel 317. According to the "in cell" example shown in FIG. 3C, the conductive layer 303 of the Coulomb force apparatus is also a conductive layer of the OLED panel 320. The touch panel 317 and the OLED panel 320 may, in some examples, include two or more conductive layers. It may be preferable that the conductive layer 303 of the Coulomb force apparatus is the closest conductive layer of the touch panel 317 or the OLED panel 320 to the outer surface 305.

Figure 4:
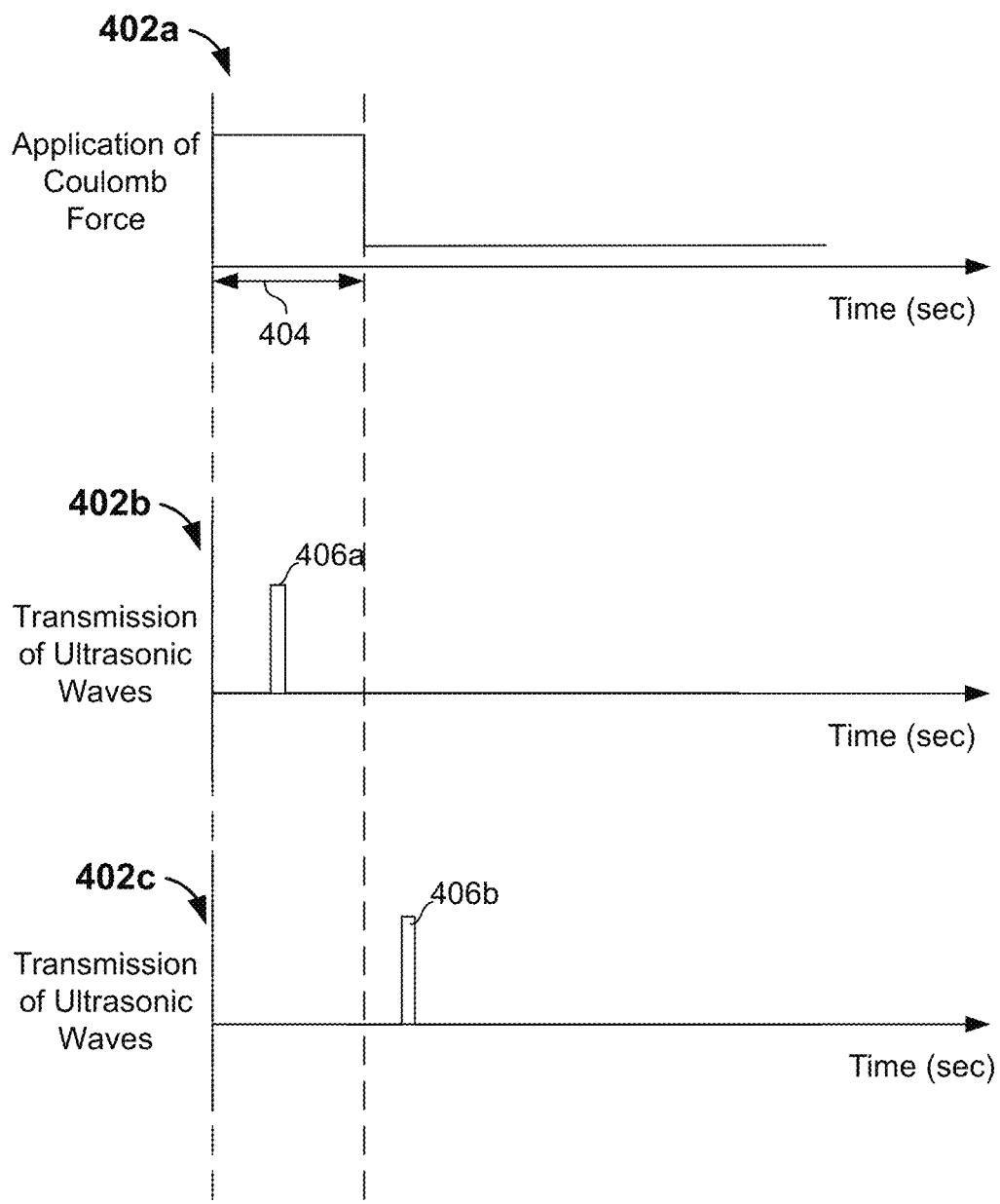
FIG. 4 shows examples of synchronizing the application of a Coulomb force and the transmission of ultrasonic waves.

FIG. 4 shows examples of synchronizing the application of a Coulomb force and the transmission of ultrasonic waves. In this example, graph 402a shows an example of controlling a Coulomb force apparatus for application of the Coulomb force during a time interval 404. Graph 402a provides an example of block 203 of FIG. 2. In some examples the Coulomb force may be applied continuously during the time interval 404, whereas in other examples the Coulomb force may be applied intermittently during the time interval 404.

In this example, graph 402b provides an example of block 205 of FIG. 2. According to this example, graph 402b shows an example of controlling an ultrasonic transmitter for transmission of ultrasonic waves during a time interval 406a that at least partially coincides with the time interval 404. In some such examples, ultrasonic waves reflected from a target object may be received during a subsequent time interval that at least partially coincides with the time interval 404. However, in other examples ultrasonic waves reflected from a target object may be received during a time interval that does not overlap with the time interval 404.

In this example, graph 402c provides an alternative example of block 205 of FIG. 2. According to this example, graph 402c shows an example of controlling an ultrasonic transmitter for transmission of ultrasonic waves during a time interval 406b that does not coincide with the time interval 404, but instead is after the time interval 404.

Some disclosed implementations may involve additional image processing for instances in which ultrasonic waves are transmitted and/or received during a time interval that at least partially coincides with a time interval during which a time-varying voltage is being applied to the Coulomb force apparatus, resulting in an electrovibrational Coulomb force being applied to a finger in contact with an outer surface of the apparatus. According to some examples, the time-varying voltage may be applied at a frequency in the range of 1 Hz to 1,000 Hz. Some such implementations may involve detecting background noise in the ultrasonic receiver signals based, at least in part, on low-frequency vibrations caused by the electrovibrational Coulomb force. For example, features which are modulated by the low-frequency vibrations may be actual fingerprint features, whereas features which are invariant to the low-frequency vibrations may be background features.

In some instances, such background features may arise from the mechanical construction of a fingerprint sensor and/or from an associated process of attaching the fingerprint sensor to other parts of a device, e.g., attachment to a platen, attachment to a display device (such as an OLED display). For example, the attachment process may involve lamination. These background features may change with temperature and aging of the sensor. The presence of such background features can reduce the quality of a fingerprint image, thereby reducing the accuracy of an authentication process. In some instances, the presence of background features may increase the false rejection rate and/or the false acceptance rate of an authentication process. Eliminating at least some background features can improve the signal-to-noise ratio of fingerprint image data. Therefore, although such background features may be static and non-random, background features may sometimes be referred to herein as "background noise."

Figure 5:
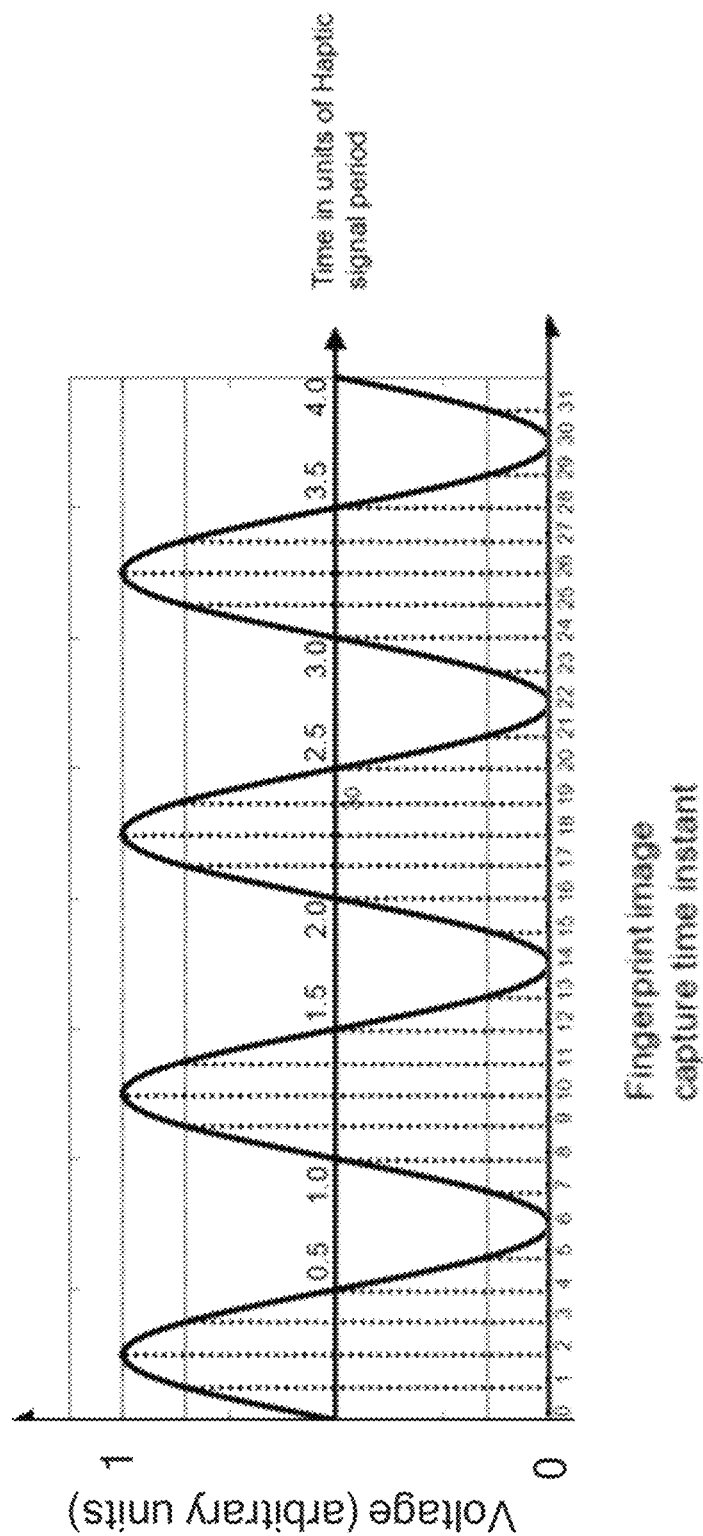
FIG. 5 shows an example of a time-varying voltage that may be applied to a Coulomb force apparatus.
Figure 6A:
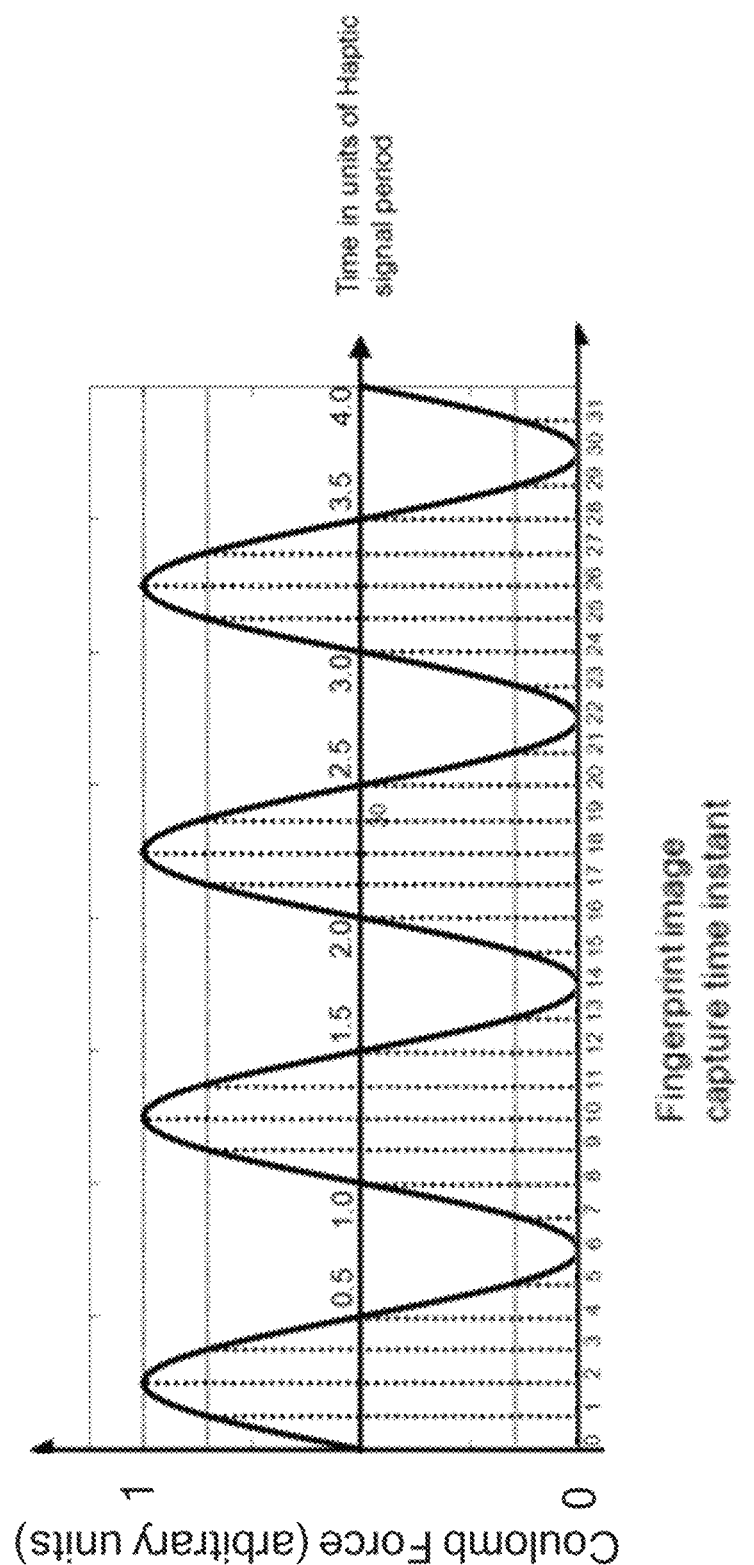
FIG. 6A shows an example of a time-varying Coulomb force.
Figure 6B:
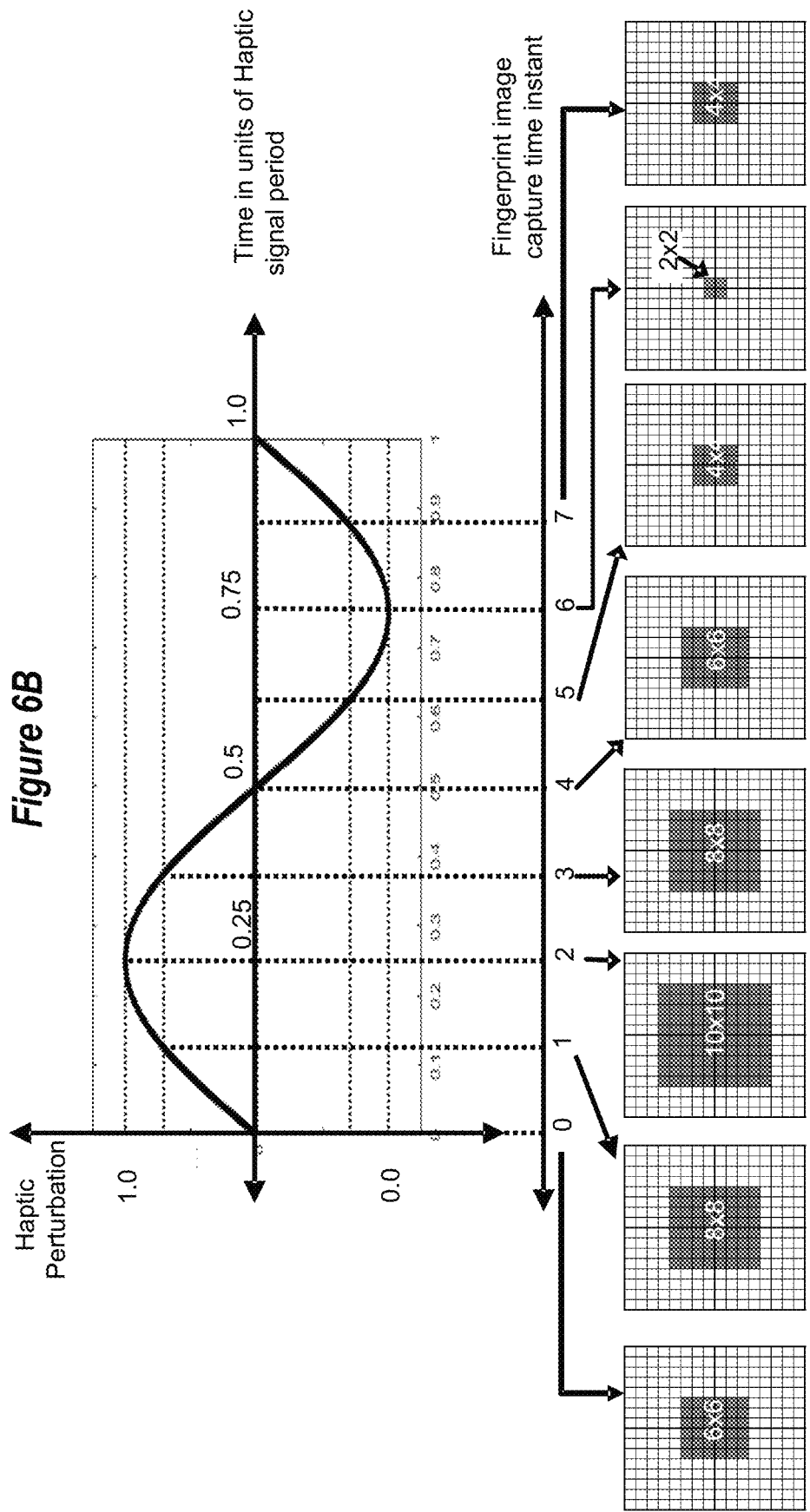
FIG. 6B shows an example of the perturbation of a fingerprint feature over one period of the haptic perturbation signal.

FIGS. 5-6B show examples of a coherent detection method. In these examples, the times during which fingerprint images are captured by an ultrasonic receiver (which may be referred to herein as "acquisition times" or "sample times") are synchronized with the period and phase of vibrations, which may be low-frequency vibrations in some instances, caused by a time-varying Coulomb force. In this example and in subsequent examples, the vibrations may be referred as a "haptic perturbation," a "haptic signal" or a "haptic perturbation signal." In some such examples, the vibrations are actually produced by a haptic device. However, in other examples, the vibrations described as a haptic perturbation, a haptic perturbation signal, etc., are not produced by a haptic device. The same principles discussed below apply for implementations in which the low-frequency vibrations are produced by another type of device.

FIG. 5 shows an example of a time-varying voltage that may be applied to a Coulomb force apparatus. According to some examples, the time-varying voltage may be applied at a frequency in the range of 1 Hz to 1,000 Hz. In some such examples, the time-varying voltage may be in the range of 100-2,000 Volts. In some examples, the time-varying voltage may be applied by a control system, such as the control system 106 of FIG. 1.

FIG. 6A shows an example of a time-varying Coulomb force. The time-varying Coulomb force may, for example, correspond with the time-varying voltage shown in FIG. 5. Accordingly, in some examples the time-varying Coulomb force may be applied at a frequency in the range of 1 Hz to 1,000 Hz. In some examples, the time-varying Coulomb force may be applied by the Coulomb force apparatus 110 of FIG. 1. According to some examples, the Coulomb force may be in the range of 1-100 gram-force.

In the examples shown in FIGS. 5 and 6A, the haptic perturbation signal is shown as a sinusoidal waveform for illustrative purposes. However, in alternative examples the haptic perturbation signal may be a more complex signal, such as a modulated signal. According to these examples, eight sets of ultrasonic receiver signals are captured for every period of the haptic perturbation, at phases 0, 45, 90, 135, 180, 225, 270 and 315 degrees. In other examples, more or fewer sets of ultrasonic receiver signals may be captured for every period of the haptic perturbation, e.g., six sets of ultrasonic receiver signals, ten sets of ultrasonic receiver signals, twelve sets of ultrasonic receiver signals, fourteen sets of ultrasonic receiver signals, sixteen sets of ultrasonic receiver signals, etc.

FIG. 6B shows an example of the perturbation of a fingerprint feature over one period of the haptic perturbation signal. To simplify the illustration, the fingerprint sensor is represented as a 16-pixel by 16-pixel square and the fingerprint feature is represented as a square-shaped pattern. In this example, the un-perturbed fingerprint feature occupies a 6-pixel by 6-pixel square. According to this example, the fingerprint feature is spatially modulated by the haptic perturbation signal, which is a time-varying Coulomb force in this instance. When the haptic perturbation signal is applied, the area occupied by the fingerprint feature grows to as large as a 10-pixel by 10-pixel area. When the Coulomb force reaches a minimum, the area occupied by the fingerprint feature shrinks to a 2-pixel by 2-pixel area in this example.

In other examples, the change in area of a fingerprint feature may be different. The variation may be caused by differences in the applied Coulomb force and/or by differences in the material properties of the particular finger.

In this example, the spatial increase and decrease in size are correlated with the phase of the haptic signal: the larger the applied Coulomb force at a particular instant, the larger the area occupied by the fingerprint feature. Because background features are not generally affected by the presence, absence or magnitude of the Coulomb force, the background features will generally remain the same size. Accordingly, the static background features may be readily distinguished from the spatially modulating fingerprint features.

In FIGS. 7A through 8B, fingerprint features are depicted as rectangles and background features are depicted as circles or ellipses. The same fingerprint features are shown in FIGS. 7A through 8B.

Figure 7A:
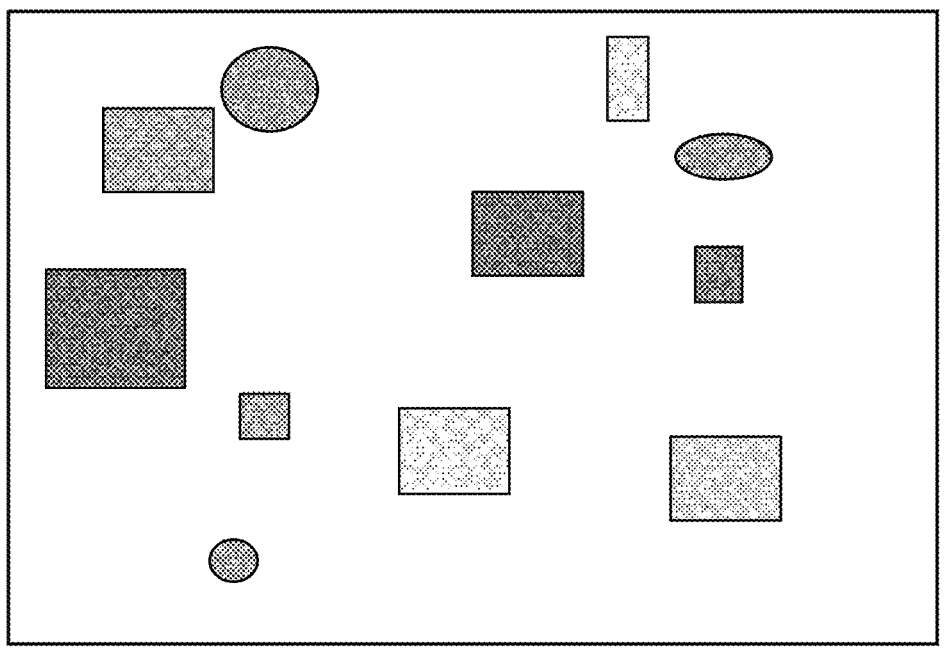
FIG. 7A shows an example of fingerprint features with no perturbation.

FIG. 7A shows an example of fingerprint features with no perturbation. In this example, no Coulomb force is being applied.

Figure 7B:
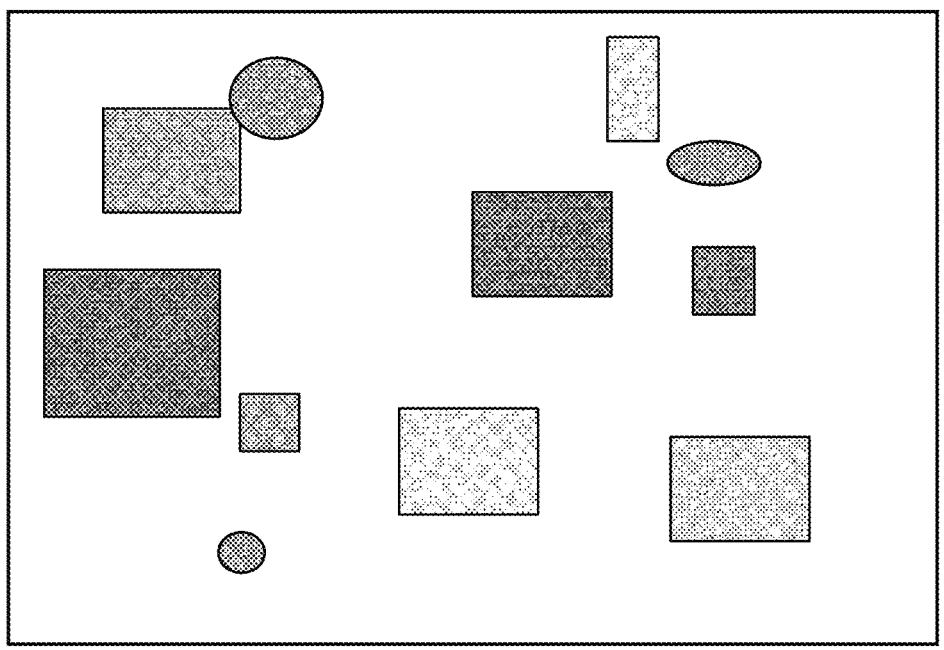
FIG. 7B provides examples of fingerprint feature perturbation.

FIG. 7B provides examples of fingerprint feature perturbation. In this example, a Coulomb force is being applied. Due to the effect of the applied Coulomb force, the fingerprint features are enlarged because the corresponding fingerprint ridges and valleys of the fingerprint are being pressed more forcefully against a surface of the ultrasonic fingerprint sensor, or against a surface of a device that includes the ultrasonic fingerprint sensor.

Figure 8A:
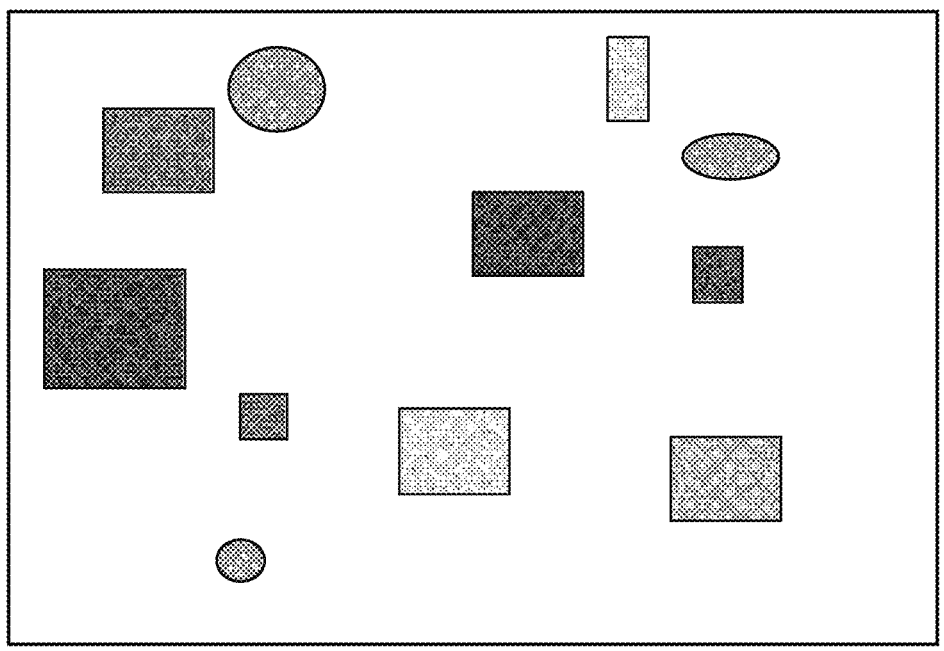
FIGS. 8A and 8B provide additional examples of fingerprint feature perturbation.
Figure 8B:
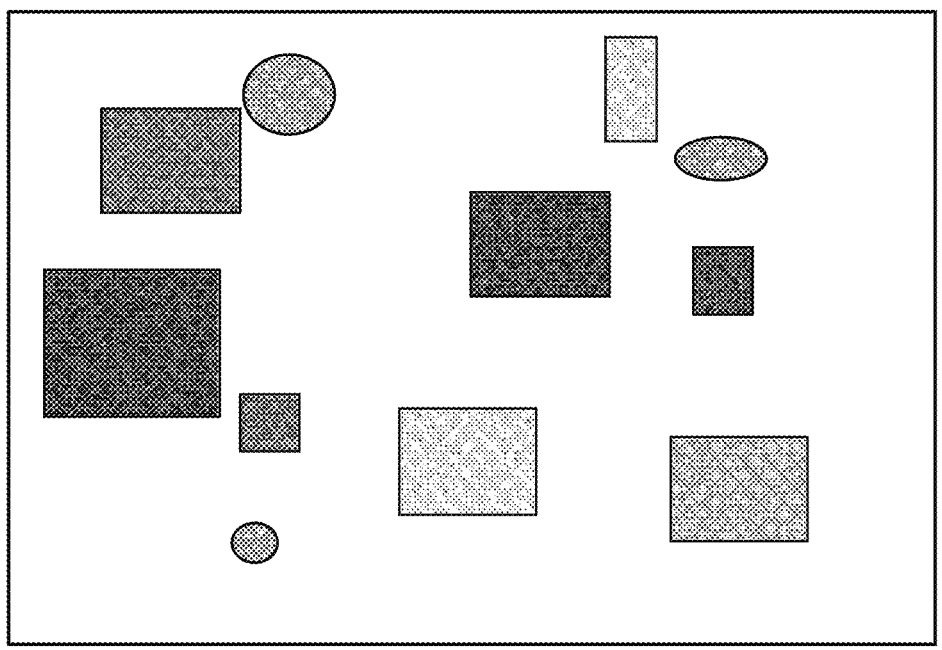

FIGS. 8A and 8B provide additional examples of fingerprint feature perturbation. In the example shown in FIG. 8A, the fingerprint features are the same size as those shown in FIG. 7A. However, the fingerprint features shown in FIG. 8A have a higher intensity than those shown in FIG. 7A. This higher intensity is indicated by the relatively darker shading in the fingerprint features of FIG. 8A as compared to the fingerprint features of FIG. 7A. The higher intensity may, for example, be the result of higher-amplitude reflections received by an ultrasonic fingerprint sensor.

The higher intensity may result from various factors, such as better coupling of the finger to the surface of the ultrasonic fingerprint sensor, or to a surface of a device that includes the ultrasonic fingerprint sensor. The improved coupling may, for example, result from increased secretion of oil or sweat from the finger, caused by the applied Coulomb force and/or by a user's reaction to the applied Coulomb force. In some such examples, a user may produce more sweat in response to perceived haptic feedback caused by the applied Coulomb force.

In the example shown in FIG. 8B, the fingerprint features are larger than those shown in FIG. 7A and also have a higher intensity than those shown in FIG. 7A. This higher intensity is indicated by the relatively darker shading in the fingerprint features of FIG. 8B as compared to the fingerprint features of FIG. 7A. In this example, the applied Coulomb force caused better coupling and also caused the corresponding fingerprint ridges and valleys of the fingerprint to be pressed more forcefully against a surface of the ultrasonic fingerprint sensor, or against a surface of a device that includes the ultrasonic fingerprint sensor.

Figure 9:
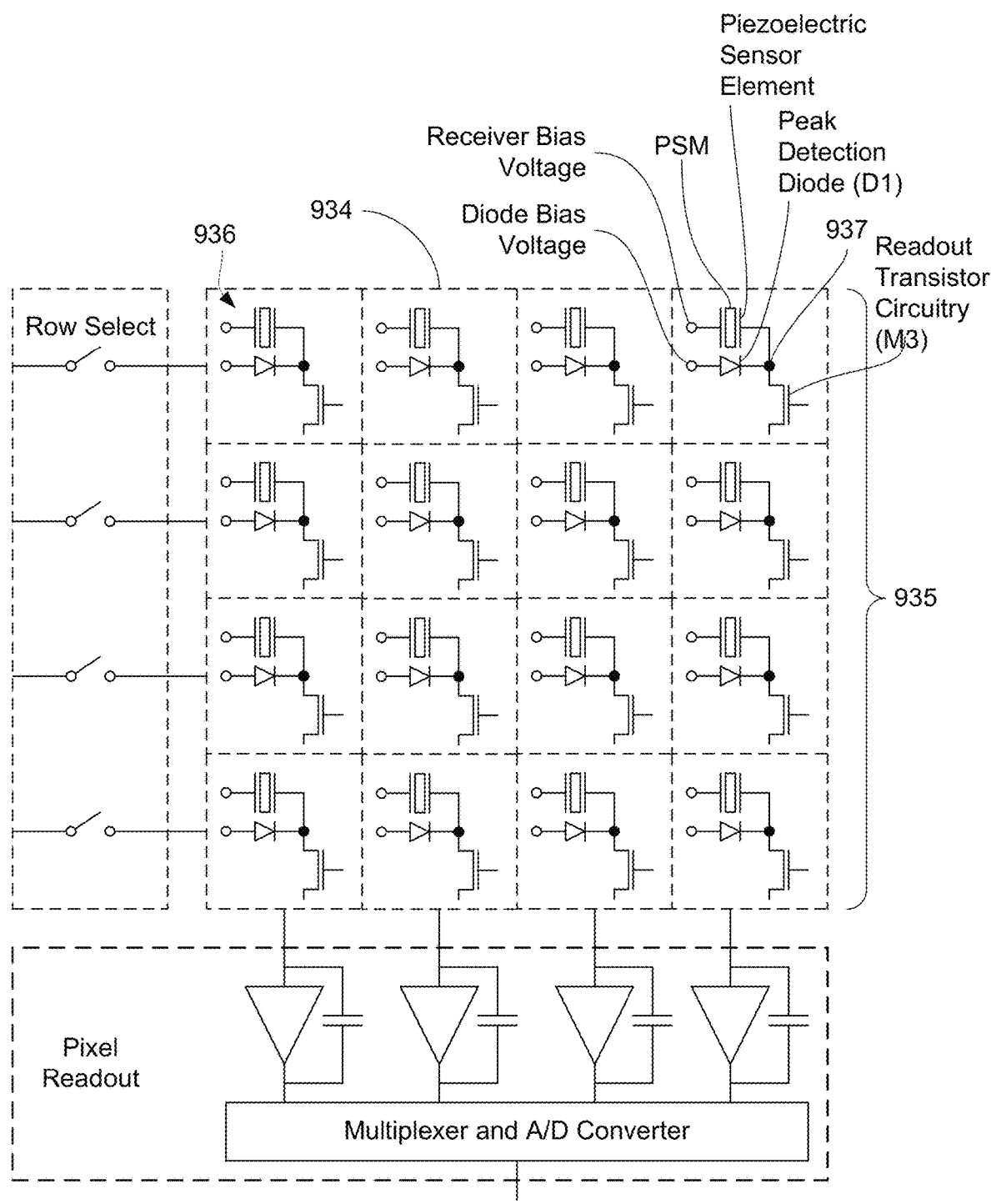
FIG. 9 representationally depicts aspects of a 4×4 pixel array of sensor pixels for an ultrasonic sensor system.

FIG. 9 representationally depicts aspects of a 4×4 pixel array of sensor pixels for an ultrasonic sensor system. Each sensor pixel 934 may be, for example, associated with a local region of piezoelectric sensor material (PSM), a pixel input electrode 937, a peak detection diode (D1) and a readout transistor circuitry (M3); many or all of these elements may be formed on or in a substrate to form the pixel circuit 936. In practice, the local region of piezoelectric sensor material of each sensor pixel 934 may transduce received ultrasonic energy into electrical charges. The peak detection diode D1 may register the maximum amount of charge detected by the local region of piezoelectric sensor material PSM. Each row of the pixel array 935 may then be scanned, e.g., through a row select mechanism, a gate driver, or a shift register, and the readout transistor circuitry M3 for each column may be triggered to allow the magnitude of the peak charge for each sensor pixel 934 to be read by additional circuitry, e.g., a multiplexer and an A/D converter. The pixel circuit 936 may include one or more TFTs to allow gating, addressing, and resetting of the sensor pixel 934.

Each pixel circuit 936 may provide information about a small portion of the object detected by the ultrasonic sensor system. While, for convenience of illustration, the example shown in FIG. 9 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 8 mm×3 mm, 5 mm×5 mm or 9 mm×4 mm for a single finger to about 3 inches×3 inches for four fingers. Smaller and larger areas, including square, rectangular and non-rectangular geometries, may be used as appropriate for the target object.

Figure 10A:
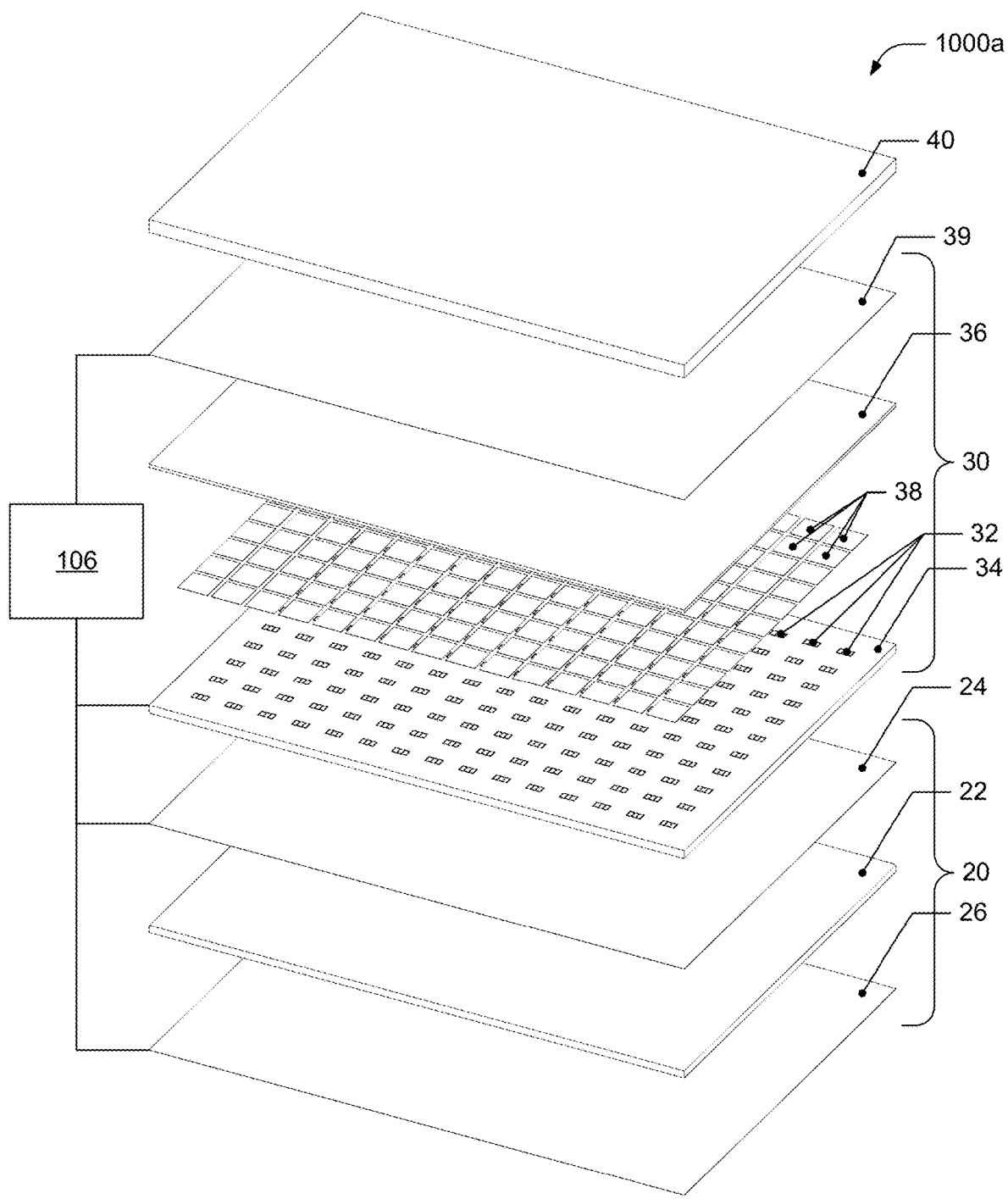
FIG. 10A shows an example arrangement of ultrasonic transmitters and receivers in an ultrasonic sensor system, with other arrangements being possible.

FIG. 10A shows an example of an exploded view of an ultrasonic sensor system. In this example, the ultrasonic sensor system 1000a includes an ultrasonic transmitter 20 and an ultrasonic receiver 30 under a platen 40. According to some implementations, the ultrasonic receiver 30 may be an example of the ultrasonic receiver 103 that is shown in FIG. 1 and described above. In some implementations, the ultrasonic transmitter 20 may be an example of the ultrasonic transmitter 105 that is shown in FIG. 1 and described above. The ultrasonic transmitter 20 may include a substantially planar piezoelectric transmitter layer 22 and may be configured for functioning as a plane wave generator. Ultrasonic waves may be generated by applying a voltage to the piezoelectric layer to expand or contract the layer, depending upon the signal applied, thereby generating a plane wave. In this example, the control system 106 may be configured for causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This generated ultrasonic wave may travel towards a finger (or other object to be detected), passing through the platen 40. A portion of the wave not absorbed or transmitted by the object to be detected may be reflected so as to pass back through the platen 40 and be received by the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT- or silicon-based elements, electrical interconnect traces and, in some implementations, one or more additional circuit elements such as diodes, capacitors, and the like. Each sensor pixel circuit 32 may be configured to convert surface charge generated by the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into surface charge by the piezoelectric receiver layer 36. The generated surface charge may be coupled to the pixel input electrodes 38 and underlying sensor pixel circuits 32. The charge signal may be amplified or buffered by the sensor pixel circuits 32 and provided to the control system 106.

The control system 106 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 106 may operate substantially as described above. For example, the control system 106 may be configured for processing the amplified signals received from the sensor pixel circuits 32.

The control system 106 may be configured for controlling the ultrasonic transmitter 20 and/or the ultrasonic receiver 30 to obtain ultrasonic data, which may include fingerprint data. According to some implementations, the control system 106 may be configured for providing functionality such as that described herein.

Whether or not the ultrasonic sensor system 1000a includes a separate ultrasonic transmitter 20, in some implementations the control system 106 may be configured for obtaining attribute information from the ultrasonic data. In some examples, the control system 106 may be configured for controlling access to one or more devices based, at least in part, on the attribute information. The ultrasonic sensor system 1000a (or an associated device) may include a memory system that includes one or more memory devices. In some implementations, the control system 106 may include at least a portion of the memory system. The control system 106 may be configured for obtaining attribute information from ultrasonic data and storing the attribute information in the memory system. In some implementations, the control system 106 may be configured for capturing a fingerprint image, obtaining attribute information from the fingerprint image and storing attribute information obtained from the fingerprint image (which may be referred to herein as fingerprint image information) in the memory system. According to some examples, the control system 106 may be configured for capturing a fingerprint image, obtaining attribute information from the fingerprint image and storing attribute information obtained from the fingerprint image even while maintaining the ultrasonic transmitter 20 in an "off" state.

In some implementations, the control system 106 may be configured for operating the ultrasonic sensor system 1000a in an ultrasonic imaging mode or a force-sensing mode. In some implementations, the control system may be configured for maintaining the ultrasonic transmitter 20 in an "off" state when operating the ultrasonic sensor system in a force-sensing mode. The ultrasonic receiver 30 may be configured for functioning as a force sensor when the ultrasonic sensor system 1000a is operating in the force-sensing mode. In some implementations, the control system 106 may be configured for controlling other devices, such as a display system, a communication system, etc. In some implementations, the control system 106 may be configured for operating the ultrasonic sensor system 1000a in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is configured for imaging fingerprints in a force detection mode or a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 μm thick and a PVDF-TrFE receiver layer 36 is approximately 12 μm thick. Example frequencies of the ultrasonic waves may be in the range of 5 MHz to 30 MHz, with wavelengths on the order of a millimeter or less.

Figure 10B:
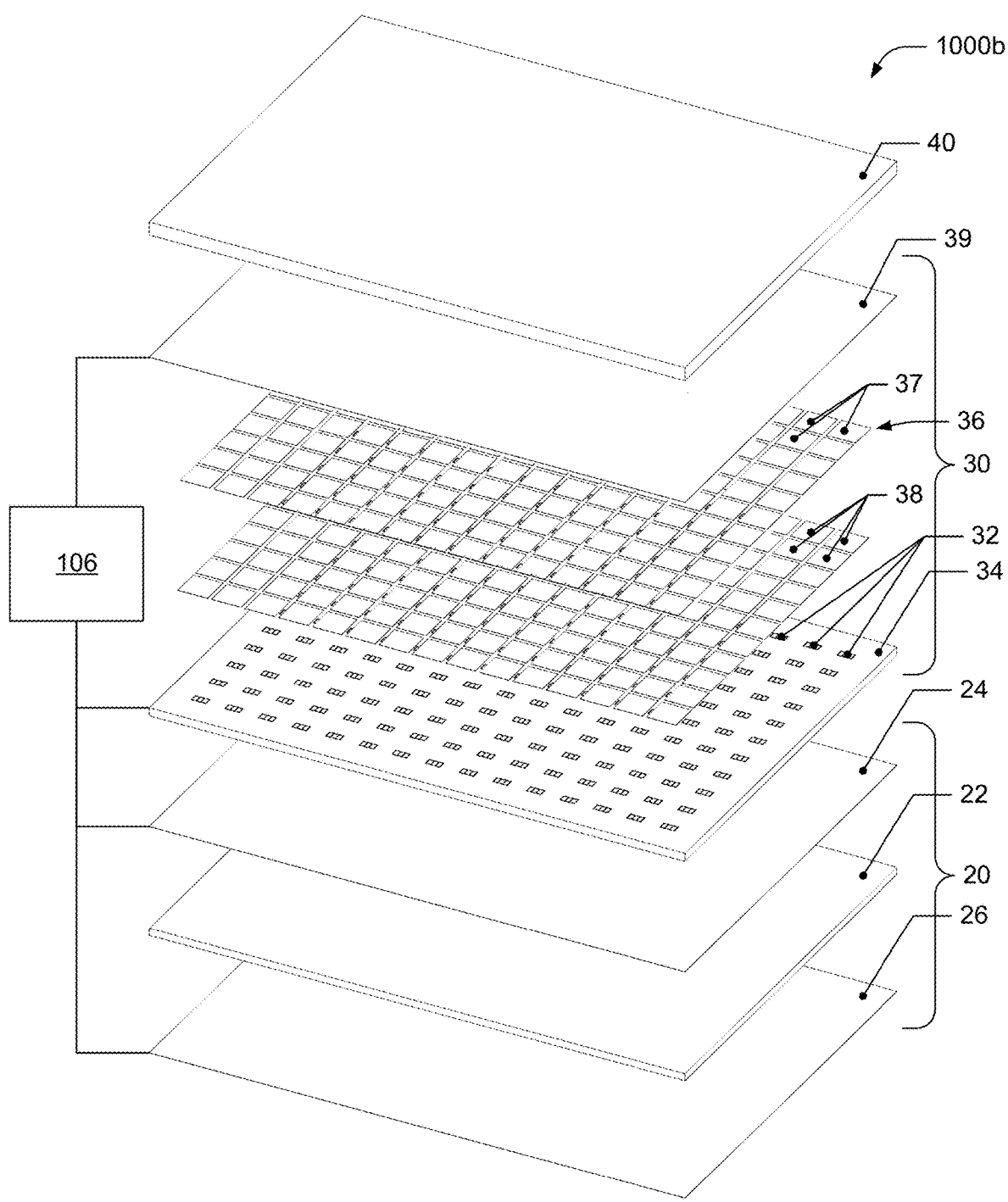
FIG. 10B shows another example of an ultrasonic sensor system.

FIG. 10B shows an exploded view of an alternative example of an ultrasonic sensor system. In this example, the piezoelectric receiver layer 36 has been formed into discrete elements 37. In the implementation shown in FIG. 10B, each of the discrete elements 37 corresponds with a single pixel input electrode 38 and a single sensor pixel circuit 32. However, in alternative implementations of the ultrasonic sensor system 1000b, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 10A and 10B show example arrangements of ultrasonic transmitters and receivers in an ultrasonic sensor system, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor array (e.g., a single-layer transmitter and receiver). In some implementations, the ultrasonic sensor system may include an acoustic delay layer. For example, an acoustic delay layer may be incorporated into the ultrasonic sensor system between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic sensor system is arriving at the ultrasonic receiver 30. In some implementations, the substrate 34 and/or the platen 40 may serve as an acoustic delay layer.

Figure 10C:
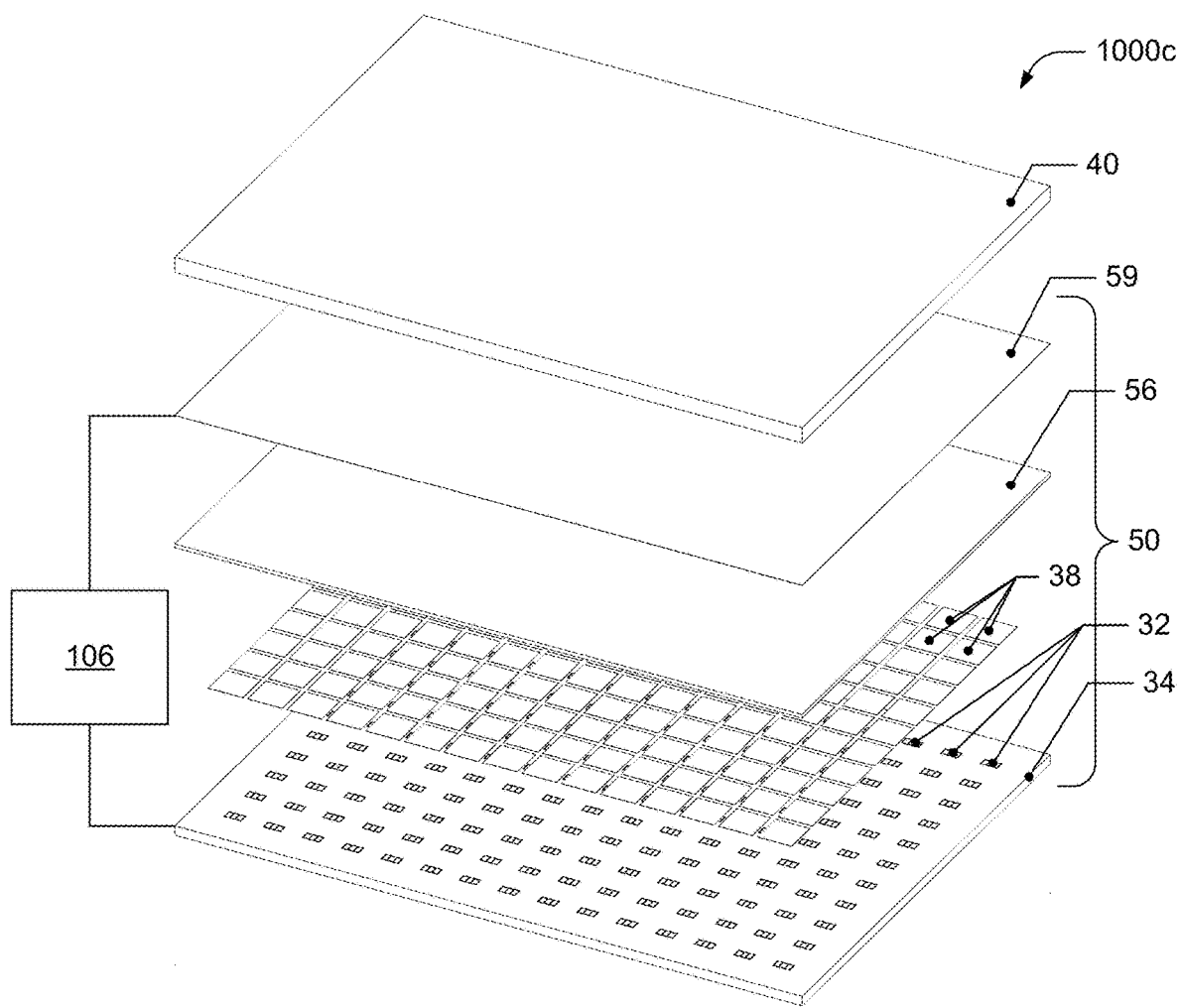
FIG. 10C shows an example of an ultrasonic transceiver array in an ultrasonic system.

FIG. 10C shows an exploded view of an example of an ultrasonic sensor system. In this example, the ultrasonic sensor system 1000c includes an ultrasonic transceiver array 50 under a platen 40. According to some implementations, the ultrasonic transceiver array 50 may serve as both the ultrasonic receiver 103 and the ultrasonic transmitter 105 that is shown in FIG. 1 and described above. The ultrasonic transceiver array 50 may include a substantially planar piezoelectric transceiver layer 56 configured for functioning as a plane wave generator. Ultrasonic waves may be generated by applying a voltage across the transceiver layer 56. The control system 106 may be configured for generating a transceiver excitation voltage that may be applied to the piezoelectric transceiver layer 56 via one or more underlying pixel input electrodes 38 or one or more overlying transceiver bias electrodes 59. The generated ultrasonic wave may travel towards a finger or other object to be detected, passing through the platen 40. A portion of the wave not absorbed or transmitted by the object may be reflected so as to pass back through the platen 40 and be received by the ultrasonic transceiver array 50.

The ultrasonic transceiver array 50 may include an array of sensor pixel circuits 32 disposed on a substrate 34. In some implementations, each sensor pixel circuit 32 may include one or more TFT- or silicon-based elements, electrical interconnect traces and, in some implementations, one or more additional circuit elements such as diodes, capacitors, and the like. Each sensor pixel circuit 32 may include a pixel input electrode 38 that electrically couples the piezoelectric transceiver layer 56 to the sensor pixel circuit 32.

In the illustrated implementation, the transceiver bias electrode 59 is disposed on a side of the piezoelectric transceiver layer 56 proximal to the platen 40. The transceiver bias electrode 59 may be a metallized electrode and may be grounded or biased to control which signals may be generated and which reflected signals may be passed to the array of sensor pixel circuits 32. Ultrasonic energy that is reflected from the exposed (top) surface of the platen 40 may be converted into surface charge by the piezoelectric transceiver layer 56. The generated surface charge may be coupled to the pixel input electrodes 38 and underlying sensor pixel circuits 32. The charge signal may be amplified or buffered by the sensor pixel circuits 32 and provided to the control system 106.

The control system 106 may be electrically connected (directly or indirectly) to the transceiver bias electrode 59 and the sensor pixel circuits 32 on the sensor substrate 34. In some implementations, the control system 106 may operate substantially as described above. For example, the control system 106 may be configured for processing the amplified signals received from the sensor pixel circuits 32.

The control system 106 may be configured for controlling the ultrasonic transceiver array 50 to obtain ultrasonic data, which may include fingerprint data. According to some implementations, the control system 106 may be configured for providing functionality such as that described herein, e.g., such as described herein.

In other examples of an ultrasonic sensor system with an ultrasonic transceiver array, a backside of the sensor substrate 34 may be attached directly or indirectly to an overlying platen 40. In operation, ultrasonic waves generated by the piezoelectric transceiver layer 56 may travel through the sensor substrate 34 and the platen 40, reflect off a surface of the platen 40, and travel back through the platen 40 and the sensor substrate 34 before being detected by sensor pixel circuits 32 on or in the substrate sensor 34.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus, comprising:
    an ultrasonic fingerprint sensor residing in a fingerprint sensor area;
    a Coulomb force apparatus configured for applying a Coulomb force in the fingerprint sensor area; and
    a control system configured for:
        controlling the Coulomb force apparatus for application of a Coulomb force to a digit in contact with an outer surface of the apparatus in the fingerprint sensor area;
        controlling the ultrasonic fingerprint sensor for transmission of first ultrasonic waves towards the digit;
        synchronizing the application of the Coulomb force and the transmission of the first ultrasonic waves;
        receiving ultrasonic receiver signals from the ultrasonic fingerprint sensor, the ultrasonic receiver signals including signals corresponding to reflections of the first ultrasonic waves from the digit; and
        performing an authentication process based, at least in part, on the ultrasonic receiver signals.

2. The apparatus of claim 1, wherein the Coulomb force is an electrostatic force.

3. The apparatus of claim 2, wherein controlling the Coulomb force apparatus involves applying a constant voltage to the Coulomb force apparatus for a time interval.

4. The apparatus of claim 1, wherein the Coulomb force is an electrovibrational force.

5. The apparatus of claim 4, wherein controlling the Coulomb force apparatus involves applying a time-varying voltage to the Coulomb force apparatus.

6. The apparatus of claim 5, wherein the control system comprises an electrovibration actuator.

7. The apparatus of claim 4, wherein the control system is configured for controlling the Coulomb force apparatus for generation of the electrovibrational force in a plane of the outer surface or perpendicular to the plane of the outer surface.

8. The apparatus of claim 1, wherein synchronizing the application of the Coulomb force and the transmission of the first ultrasonic waves comprises:
    controlling the Coulomb force apparatus for application of the Coulomb force during a first time interval; and
    controlling the ultrasonic fingerprint sensor for transmission of the first ultrasonic waves during a second time interval that is after the first time interval.

9. The apparatus of claim 1, wherein synchronizing the generation of first low-frequency vibrations and the transmission of first ultrasonic waves comprises:
    controlling the Coulomb force apparatus for application of the Coulomb force during a first time interval; and
    controlling the ultrasonic fingerprint sensor for transmission of the first ultrasonic waves during a second time interval that at least partially coincides with the first time interval.

10. The apparatus of claim 9, wherein the first time interval begins before the second time interval and includes the second time interval.

11. The apparatus of claim 1, wherein the control system is configured for controlling the Coulomb force apparatus for application of a Coulomb force in the fingerprint sensor area, the Coulomb force having a component that is perpendicular to the outer surface.

12. The apparatus of claim 1, wherein the control system is configured for controlling the Coulomb force apparatus to cause a higher level of at least one of static frictional force or dynamic frictional force in the fingerprint sensor area, as compared to the static frictional force or dynamic frictional force outside of the fingerprint sensor area.

13. The apparatus of claim 1, wherein the control system is configured for controlling the Coulomb force apparatus to cause an electrovibrational force in the fingerprint sensor area, the electrovibrational force causing haptic feedback to the digit.

14. The apparatus of claim 1, wherein the outer surface has a first texture in the fingerprint sensor area and a second texture outside of the fingerprint sensor area.

15. The apparatus of claim 1, further comprising a touch sensor system, wherein the control system is further configured for:
    determining a digit position based on one or more signals received from the touch sensor system; and
    controlling the Coulomb force apparatus according to the digit position.

16. The apparatus of claim 1, wherein the control system is further configured for determining a digit position based on one or more signals received from the Coulomb force apparatus.

17. The apparatus of claim 1, wherein an area occupied by the Coulomb force apparatus is equal to, or substantially equal to, the fingerprint sensor area.

18. The apparatus of claim 1, wherein an area occupied by the Coulomb force apparatus extends beyond the fingerprint sensor area.

19. A method of controlling an apparatus that includes an ultrasonic fingerprint sensor and a Coulomb force apparatus, the method comprising:
    controlling the Coulomb force apparatus for application of a Coulomb force to a digit in contact with an outer surface of the apparatus in a fingerprint sensor area;
    controlling the ultrasonic fingerprint sensor for transmission of first ultrasonic waves towards the digit;
    synchronizing the application of the Coulomb force and the transmission of the first ultrasonic waves;
    receiving ultrasonic receiver signals from the ultrasonic fingerprint sensor, the ultrasonic receiver signals including signals corresponding to reflections of the first ultrasonic waves from the digit; and
    performing an authentication process based, at least in part, on the ultrasonic receiver signals.

20. The method of claim 19, wherein controlling the Coulomb force apparatus involves applying a constant voltage to the Coulomb force apparatus for a time interval.

21. The method of claim 19, wherein controlling the Coulomb force apparatus involves applying a time-varying voltage to the Coulomb force apparatus.

22. The method of claim 19, wherein synchronizing the generation of first low-frequency vibrations and the transmission of first ultrasonic waves comprises:
controlling the Coulomb force apparatus for application of the Coulomb force during a first time interval; and
controlling the ultrasonic fingerprint sensor for transmission of the first ultrasonic waves during a second time interval that at least partially coincides with the first time interval.

23. The method of claim 22, wherein the first time interval begins before the second time interval and includes the second time interval.

24. The method of claim 19, further comprising controlling the Coulomb force apparatus to cause a higher level of at least one of static frictional force or dynamic frictional force in the fingerprint sensor area, as compared to the static frictional force or dynamic frictional force outside of the fingerprint sensor area.

25. The method of claim 19, wherein the apparatus includes a touch sensor system and wherein the method further comprises:
determining a digit position based on one or more signals received from the touch sensor system; and
controlling the Coulomb force apparatus according to the digit position.

26. One or more non-transitory media having software stored thereon, the software including instructions for controlling an apparatus that includes an ultrasonic fingerprint sensor and a Coulomb force apparatus, the method comprising:
controlling the Coulomb force apparatus for application of a Coulomb force to a digit in contact with an outer surface of the apparatus in a fingerprint sensor area;
controlling the ultrasonic fingerprint sensor for transmission of first ultrasonic waves towards the digit;
synchronizing the application of the Coulomb force and the transmission of the first ultrasonic waves;
receiving ultrasonic receiver signals from the ultrasonic fingerprint sensor, the ultrasonic receiver signals including signals corresponding to reflections of the first ultrasonic waves from the digit; and
performing an authentication process based, at least in part, on the ultrasonic receiver signals.

27. The one or more non-transitory media of claim 26, wherein controlling the Coulomb force apparatus involves applying a constant voltage to the Coulomb force apparatus for a time interval.

28. The one or more non-transitory media of claim 26, wherein controlling the Coulomb force apparatus involves applying a time-varying voltage to the Coulomb force apparatus.

29. An apparatus, comprising:
an ultrasonic fingerprint sensor residing in a fingerprint sensor area;
a Coulomb force apparatus configured for applying a Coulomb force in the fingerprint sensor area; and
control means for:
controlling the Coulomb force apparatus for application of a Coulomb force to a digit in contact with an outer surface of the apparatus in the fingerprint sensor area;
controlling the ultrasonic fingerprint sensor for transmission of first ultrasonic waves towards the digit;
synchronizing the application of the Coulomb force and the transmission of the first ultrasonic waves;
receiving ultrasonic receiver signals from the ultrasonic fingerprint sensor, the ultrasonic receiver signals including signals corresponding to reflections of the first ultrasonic waves from the digit; and
performing an authentication process based, at least in part, on the ultrasonic receiver signals.

30. The apparatus of claim 29, wherein controlling the Coulomb force apparatus involves one or more of applying a constant voltage to the Coulomb force apparatus for a time interval or applying a time-varying voltage to the Coulomb force apparatus.

* * * * *